US007015826B1

(12) United States Patent
Chan et al.

(10) Patent No.: US 7,015,826 B1
(45) Date of Patent: Mar. 21, 2006

(54) METHOD AND APPARATUS FOR SENSING AND TRANSMITTING A BODY CHARACTERISTIC OF A HOST

(75) Inventors: Vincent K. Chan, Woodbury, MN (US); Ezequiel Mejia, Woodbury, MN (US)

(73) Assignee: Digital Angel Corporation, South St. Paul, MN (US)

( * ) Notice: Subject to any disclaimer, the term of this patent is extended or adjusted under 35 U.S.C. 154(b) by 270 days.

(21) Appl. No.: 10/114,875

(22) Filed: Apr. 2, 2002

(51) Int. Cl.
*G08C 17/00* (2006.01)
(52) U.S. Cl. ............... 340/870.17; 600/549; 340/10.41
(58) Field of Classification Search ........... 340/870.17, 340/10.3, 572.1; 702/85, 99, 104; 327/513; 374/181, 182
See application file for complete search history.

(56) References Cited

U.S. PATENT DOCUMENTS

| | | | | |
|---|---|---|---|---|
| 3,805,256 | A | * | 4/1974 | Pepin ........................ 340/870.1 |
| 4,335,371 | A | | 6/1982 | Connolly, Jr. et al. ...... 340/347 |
| 4,399,821 | A | * | 8/1983 | Bowers .................... 340/573.2 |
| 5,235,326 | A | | 8/1993 | Beigel et al. .......... 340/825.54 |
| 5,252,962 | A | | 10/1993 | Urbas et al. ........... 340/870.17 |
| 5,481,262 | A | | 1/1996 | Urbas et al. ........... 340/870.17 |
| 5,638,418 | A | | 6/1997 | Douglass et al. ............. 377/25 |
| 5,669,713 | A | | 9/1997 | Schwartz et al. ............... 374/1 |
| 5,724,030 | A | | 3/1998 | Urbas et al. ........... 340/870.17 |
| 5,764,541 | A | | 6/1998 | Hermann et al. ...... 364/571.01 |
| 5,767,792 | A | | 6/1998 | Urbas et al. ........... 340/870.17 |
| 5,822,225 | A | | 10/1998 | Quaderer et al. ...... 364/571.01 |
| 5,833,603 | A | * | 11/1998 | Kovacs et al. ............... 600/317 |
| 5,952,935 | A | * | 9/1999 | Mejia et al. ................ 340/10.3 |
| 6,054,935 | A | * | 4/2000 | Urbas et al. ........... 340/870.17 |
| 6,115,441 | A | | 9/2000 | Douglass et al. ............. 377/25 |
| 6,147,606 | A | | 11/2000 | Duan ....................... 340/572.7 |
| 6,149,299 | A | | 11/2000 | Aslan et al. ................. 374/178 |
| 6,226,324 | B1 | | 5/2001 | Allstrom ..................... 375/238 |
| 6,332,710 | B1 | * | 12/2001 | Aslan et al. ................ 374/183 |
| 6,369,712 | B1 | * | 4/2002 | Letkomiller et al. ...... 340/572.1 |
| 6,377,110 | B1 | * | 4/2002 | Cooper ....................... 327/513 |
| 6,400,261 | B1 | | 6/2002 | Starkey et al. ............. 340/442 |
| 6,483,085 | B1 | * | 11/2002 | Milanesi et al. ............ 219/497 |
| 6,512,520 | B1 | | 1/2003 | Naka et al. ................. 345/473 |
| 6,543,279 | B1 | * | 4/2003 | Yones et al. ............... 73/146.5 |

OTHER PUBLICATIONS

Liptak, "Temperature Measurement", pp. 6-19, Jun. 1993.
Bowman et al., "A Low Noise, High Resolution Silicon Temperature Sensor", pp. 1308-1313, *IEEE Journal of Solid-State Circuits*, vol. 31, No. 9, Sep. 1996.
Huijsing et al., "Micropower CMOS Temperature Sensor With Digital Output", pp. 933-937, *IEEE Journal of Solid-State Circuits*, vol. 31, No. 7, Jul. 1996.
Fraden, "Handbook of Modern Sensors: Physics, Designs, and Applications (Second Edition)"; *Springer-Verlag New York, Inc.*; 1996, pp. 483-487.
PCT Serial No. PCT/US03/07985 International Search Report dated Jul. 29, 2004.

* cited by examiner

*Primary Examiner*—Michael Horabik
*Assistant Examiner*—Hung Dang
(74) *Attorney, Agent, or Firm*—Sheridan Ross P.C.

(57) ABSTRACT

A passive transponder including an integrated sensor is disclosed. The transponder receives an interrogation signal from a scanner, and is operable to transmit identification information and body characteristic information to a scanner. The scanner is operable to receive the identification and body characteristic information and display and/or store the information. The sensor is integrated into the transponder. If temperature is to be sensed, the transponder determines the temperature of the host using the temperature dependent characteristics of the P-N junction of the integrated circuit.

114 Claims, 15 Drawing Sheets

METHOD AND APPARATUS FOR SENSING AND TRANSMITTING A BODY CHARACTERISTIC OF A HOST

FIELD OF THE INVENTION

The invention relates generally to implantable radio frequency identification (RFID) systems and, more particularly, to an implantable transponder capable of transmitting identification information and body characteristic information of a host, including but not limited to a host animal.

BACKGROUND OF THE INVENTION

Transponders and scanner systems are well known in the art. These systems generally include a scanner, or interrogator, which transmits signals to, and receives signals from, one or more transponders. The transponders may be active, in that they contain a power source such as a battery, or passive in that they receive power from an external source, such as through inductive coupling as can be the case with radio frequency technology. Passive transponders are commonly implanted in animals due to the fact that they do not rely on a self-contained power source. Such implantable, passive transponders often contain identification information for the animal. It is also known to have an implantable transponder coupled with a sensor, such as a temperature measurement device, such that the transponder is able to transmit both identification information, as well as information on the body characteristic of the animal.

The temperature measurement devices used in conjunction with these transponders have traditionally been thermistors. The resistance of the thermistor changes as a function of the temperature of the thermistor. Thus, using a properly calibrated thermistor, the temperature of the animal can be determined, and transmitted by the transponder. Typically, the transponder includes a circuit which is connected to the thermistor and measures the resistance of the thermistor by supplying a known current, and measuring the voltage across the thermistor. The voltage is then measured and a temperature value derived from the voltage measurement correlated to the known resistance characteristics of the thermistor.

As will be understood, because an implantable transponder is a passive device, it is highly desirable to have the implantable transponder consume little power. However, traditional thermistor based temperature sensors increase power consumption by requiring a predetermined current be supplied to the thermistor. This additional current increases the power consumption of the transponder significantly. Accordingly, it would be advantageous to have an implantable transponder capable of transmitting temperature information, and which also consumes less power than thermistor transponders which are capable of transmitting temperature information.

Generally, the manufacture and assembly of a temperature sensing transponder requires additional resources compared to the manufacture and assembly of a typical identification transponder. Assembly of a temperature sensing transponder is generally done after the components comprising the identification subassembly of the transponder and the components comprising the temperature sensor or thermistor have been manufactured and/or assembled. The two manufactured subassemblies or components are then combined in a separate manufacturing step. This separate manufacturing step can take a significant amount of time and resources, ultimately increasing the cost of such a transponder. As will be understood, it is advantageous to have such a transponder which is relatively inexpensive, and thus more affordable for a user who wishes to purchase the device. Accordingly, it would be advantageous to have a temperature sensor which is integrated within the normal identification components, thus reducing the costs of such a transponder by not requiring the additional components or the additional step of assembling the transponder with a separate temperature sensor.

While traditional transponders with associated temperature sensing have been somewhat successful in the past, there are several disadvantages associated with them. For example, each thermistor is required to be calibrated, in order to ensure that an accurate temperature is delivered to a user. Such a calibration is performed following the full assembly of the transponder. The assembled transponder is generally placed in a liquid bath having a known temperature. An initial temperature reading is determined using the transponder. This initial temperature reading is compared to the known temperature of the bath, and a compensation factor is determined for the transponder. This compensation factor is typically stored in a memory location within the transponder, and sent to the scanner together with the sensed temperature information requiring the scanner to perform a calculation to determine the temperature of the animal.

In addition, the calibration process is very labor intensive, further adding to the ultimate cost of such a temperature sensing transponder. Each transponder is individually calibrated because each transponder must be assembled with a temperature sensor prior to any calibration. As transponders are typically mass produced in large quantities, individual calibration can add a significant expense to the cost to manufacture such a transponder. Therefore, it would be advantageous to perform a temperature calibration in a more efficient manner, such as prior to the assembly of the transponder.

Furthermore, traditional transponders having associated temperature sensors typically transmit identification information and temperature information in a unique transmission format. For example, different manufacturers employ unique communication schemes which require particular interrogators to be able to read their transponders. Thus, one manufacturer's transmission format may not be able to be read by scanners which were not specifically designed to read such information, i.e., a competitor's scanner. This can be disadvantageous because, in the event that an animal having such a transponder becomes lost or stolen, the transponder can be used as a means of identification for the animal. However, if a scanner is used to attempt to scan a transponder and does not recognize the unique format for its identification information, the scanner will be unable to determine the identification information which is stored in the transponder. Thus, it would also be advantageous to have a temperature sensing transponder which is able to transmit identification information in a format which is able to be read by most common scanners.

SUMMARY OF THE INVENTION

The present invention solves the aforementioned problems and meets the aforementioned, and other, needs. In one embodiment, the invention provides a temperature sensing transponder having a temperature sensor integrated with the transponder. The transponder receives an interrogation signal from a scanner, and is operable to transmit identification information and calibrated temperature information to a scanner. The scanner is operable to receive the identification and calibrated temperature information and display and/or store the information. The temperature sensor is integrated into the transponder and determines the temperature of the transponder using the temperature dependent characteristics of the P-N junction.

In one embodiment, the temperature sensing transponder includes an antenna portion operable to receive an interrogation signal from a reader and to transmit a data signal to the reader, the data signal including identification information and temperature information; and an integrated circuit having a memory portion containing an identifier uniquely associated with the transponder and an integrated temperature sensor portion, the integrated circuit operable to receive the interrogation signal from the antenna portion, and generate the data signal for transmission by the antenna portion. The integrated temperature sensor portion includes a temperature sensor and is operable to generate an analog temperature signal which corresponds to a temperature of the temperature sensor. In one embodiment, the temperature sensor determines temperature based on the temperature dependent characteristics of the P-N junction. The temperature sensor may include first and second bipolar junction transistor portions, where the first and second bipolar junction transistor portions are operated at a substantially constant ratio of emitter current densities, and the analog temperature signal corresponds to a difference in base-emitter voltages between the first and second bipolar junction transistor portions.

The integrated circuit may include an analog to digital converter, the analog to digital converter being operable to receive the analog temperature signal and convert the analog temperature signal into a digital temperature code. The integrated temperature sensor is operable to read an analog trim value from the memory and adjust the analog temperature signal based on the analog trim value. The adjustment to the analog temperature signal may be an offset to the analog temperature signal based on the analog trim value, or may be a gain adjustment to an amplification portion of the integrated temperature sensor. The integrated circuit may also contain a serial adder operable to read a fine trim value from the memory and add the digital temperature code to the fine trim value to create the temperature information. Furthermore, the transponder may include one or more sensors to detect characteristics of the body in which it is embedded other than termperature. The signal from these sensors may be adjusted in a similar manner for transmission by the transponder.

The data signal transmitted from the transponder may include at least one identification telegram containing the identification information and at least one temperature telegram containing the temperature information. The data signal transmitted from the transponder may also include a single telegram containing both the identification information and the temperature information. The identification telegram may be compatible with an FDXA transmission, and the single telegram may be compatible with an FDXB transmission.

In another embodiment, the integrated circuit includes a selection circuit operable to select between a first and a second communication mode. When the first communication mode is selected, the integrated circuit generates a first telegram for inclusion in the data signal containing identification information and a second telegram for inclusion in the data signal containing temperature information. When the second communication mode is selected, the integrated circuit generates a single telegram for inclusion in the data signal containing identification and temperature information.

In yet another embodiment, the integrated circuit is operable to store history information in the memory, and transmit the history information in response to an interrogation. The history information may include additional identification information.

The present invention, in one embodiment, also provides a method for calibrating a sensor in a transponder. The method includes the steps of measuring an analog signal from the sensor when the sensor is at a predetermined state, determining an analog trim value which is proportional to a difference between the analog signal and a predetermined signal, storing the analog trim value into a first memory location, adjusting the analog signal based on the analog trim value, creating a modified analog signal, reading a digital signal based on the modified analog signal, determining a fine trim value which is proportional to a difference between the digital signal and the predetermined digital signal, and storing the fine trim value into a second memory location.

The measuring step may include reading a current from a sensor portion at an analog to digital converter; and converting said current to a digital value at the analog to digital converter. The step of determining an analog trim value may include comparing the digital value with a predetermined target value, adjusting the analog to digital converter when the digital value is not within a predetermined target range of the predetermined target value, and determining an analog trim value based on the adjusting step.

The determining a fine trim value step may include calculating a difference between the digital signal and a predetermined digital target value, and determining a fine trim value based on the calculating step. The storing the analog trim value step may include writing the analog trim value into the first memory location of a programmable memory, and the storing said fine trim value step may include writing the fine trim value into the second memory location of the programmable memory. The programmable memory may be an EEPROM.

The present invention, in one embodiment, also provides a method for transmitting identification and body characteristic information from a transponder. The method for transmitting identification and body characteristic information includes the steps of retrieving identification information from a memory within the transponder, determining a calibrated body characteristic value of the transponder, formatting the identification information into a first data structure and formatting the calibrated body characteristic value into a second data structure, transmitting the first data structure, and transmitting the second data structure. The determining a calibrated body characteristic value step may include reading an analog current associated with the body characteristic from a sensor integrated with the transponder, and determining the calibrated body characteristic value based on the analog current. The determining a calibrated body characteristic value step may also include reading an analog voltage associated with the body characteristic from a sensor integrated with the transponder, and determining the calibrated body characteristic value based on the analog voltage.

The present invention, in another embodiment, also provides a method for identifying an object and a temperature associated therewith, comprising the steps of transmitting an interrogation signal from a reader, detecting the interrogation signal at a transponder, transmitting an encoded identification and temperature signal from the transponder to the reader, receiving the encoded identification and temperature signal at the reader, and decoding identification information and temperature information at the reader, wherein at least the identification information is contained in a standardized format. The standardized format, in one embodiment, complies with ISO standard 11785. The encoded identification information may be a FDXB telegram structure and the temperature information is included in a trailer field within the FDXB telegram structure. The encoded identification information may also be a FDXA telegram structure, and also include a second telegram structure having a header field and a temperature information field. The decoding step includes, in one embodiment, determining if the encoded identification and temperature signal includes the first and said second telegram structures; and decoding identification information from the first telegram structure and decoding temperature information from the second telegram structure.

Additional features and other embodiments of the present invention will become apparent from the following discussion, particularly when taken together with the accompanying drawings.

DETAILED DESCRIPTION

Figure 1:
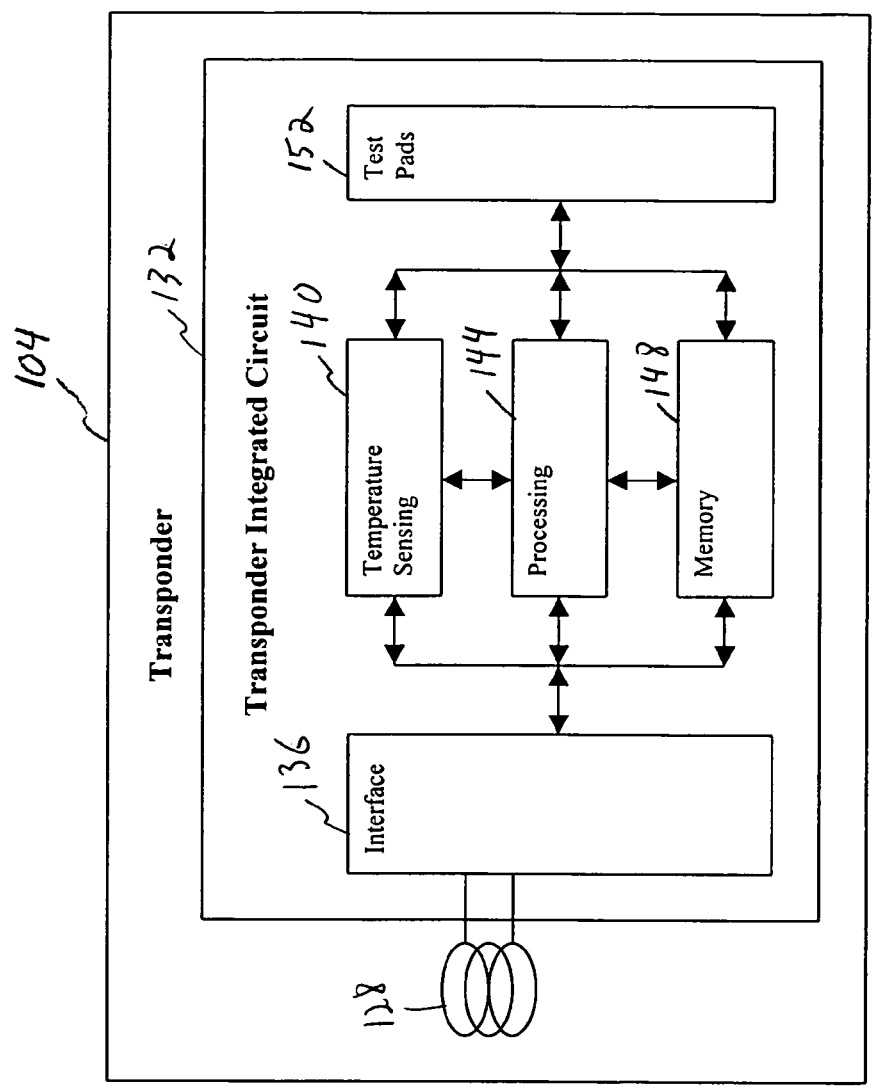
FIG. 1 is a block diagram illustration of a temperature sensing system, including a transponder and an interrogator, of one embodiment of the present invention.
Figure 1:
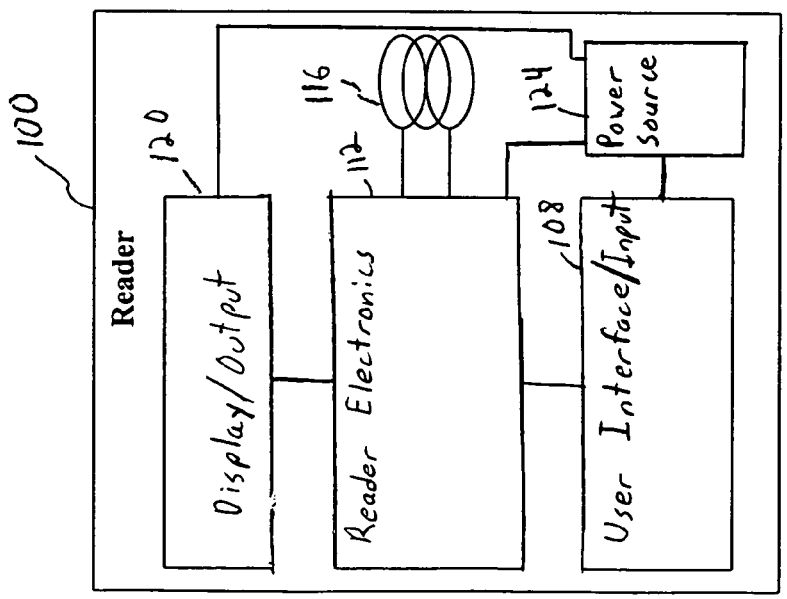

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

Referring to FIG. 1, a block diagram representation of a transponder system including a reader 100 and temperature sensing transponder 104 of one embodiment of the present invention is illustrated. The reader 100 is similar to traditional readers associated with passive transponder devices, and includes a user interface/input 108, reader electronics 112, a reader antenna 116, a display/output 120, and a power source 124. The reader 100 is operable to transmit and receive information over the reader antenna 116. Instead of a single antenna 116, the reader could have separate transmit and receive antennas, including multiple receive antennas permitting differential detection techniques which are well known in the art. The reader electronics 112 are operable to initiate a signal transmission over the reader antenna 116, and read a response signal which is received at the reader antenna 116. The response signal contains encoded information, as will be described in more detail below. The reader electronics 112 demodulate the response signal and read the encoded information. The display/output 120 may be used to display information contained in the response signal to a user, or output the information to an external device, such as an external display, printer, computer system, communication device, or storage device. The user interface/input 108 may include a simple pushbutton interface on a reader 100, which a user may depress to initiate an interrogation from the reader 100. The user interface/input 108 may also include more sophisticated keypad type interface, or a connection to an external device, such as a computer system or communication device. The reader 100 also includes a power source 124, which supplies power to the reader 100 and associated components. The power source 124 may be internal batteries which are installed in the reader 100. The power source may also have a connection to an external AC or DC source of power in addition to, or instead of, batteries.

The transponder 104 includes an antenna coil 128, and a transponder integrated circuit 132. The antenna coil 128 carries out both receive and transmit functions such as those traditionally associated with implantable transponders, and are well known in the art. While a single antenna coil 128 is illustrated, the transponder 104 could have separate transmit and receive antenna coils. An interrogation signal from the reader 100 is received at the antenna coil 128, and communicated to the transponder integrated circuit 132. The transponder integrated circuit 132 includes an interface portion 136, a temperature sensing portion 140, a processing portion 144, a memory portion 148, and a set of test pads 152. The transponder integrated circuit 132, upon receiving the interrogation signal, determines the temperature of the transponder 104 using the temperature sensing portion 140, and retrieves identification information from the memory portion 148. The transponder integrated circuit 132 then transmits identification and temperature information over the antenna coil 128 through the interface portion 136. The processing portion 144 processes information and communicates with different portions of the transponder integrated circuit 132. The test pads 152 link input signals to the processing portion and the memory portion during the initial circuit testing, temperature calibrating and identification programming processes, as will be described in further detail below. The determination of the temperature and identification information, as well as the format which is used for the transmitting of the identification and temperature information will be described in more detail in the discussion of FIGS. 2 through 15.

Figure 2:
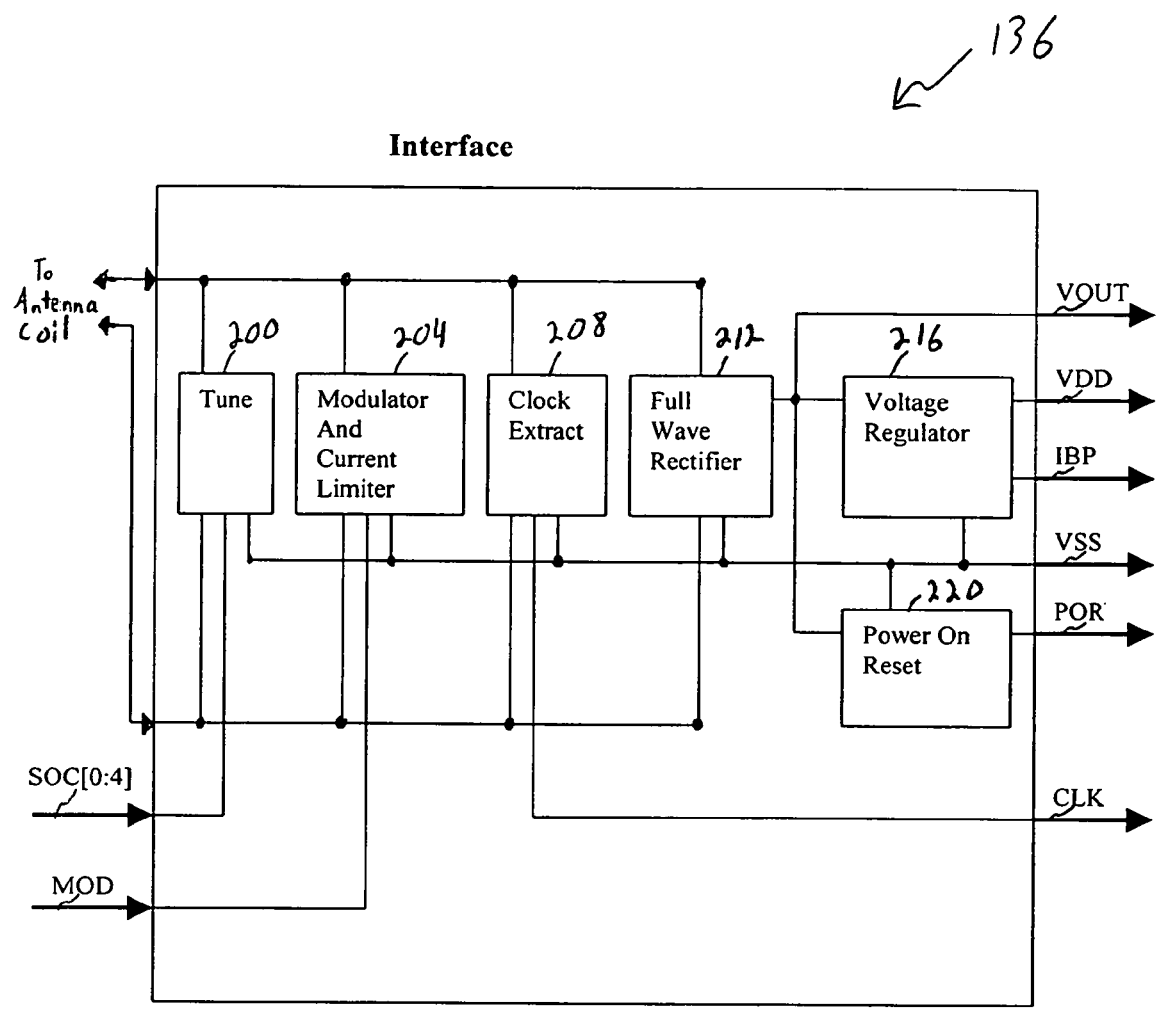
FIG. 2 is a block diagram illustration of interface circuitry for a temperature sensing transponder of an embodiment of the present invention.

Referring now to FIG. 2, a block diagram illustration of the interface portion 136 is now described. The interface portion 136 includes a tune circuit 200, a modulator and current limiter circuit 204, a clock extract circuit 208, a full wave rectifier circuit 212, a voltage regulator circuit 216, and a power on reset circuit 220. The tune circuit 200 receives an input signal SOC[0:4] from the memory portion 148 and trims the capacitance of the antenna so as to tune the antenna coil 128 to its optimal efficiency. The tune circuit 200, and its calibration, will be described in more detail below. The modulator and current limiter circuit 204 receives an input signal MOD from the processing portion 144 and modulates the information onto a carrier signal to create the response signal which is transmitted to the reader 100 through the antenna coil 128. In addition to modulating the information received from the processing portion 144, the modulator and current limiter circuit 204 limits the current that may enter the processing portion 144, temperature sensing portion 140, and memory portion 148, in order to help protect the transponder integrated circuit 140 from damage which may result from high current.

The clock extract circuit 208 receives the interrogation signal, and produces a clock signal CLK which is used as a clock for those components within the transponder integrated circuit 104 which require a clock. The clock extract circuit 208 uses the interrogation signal to generate the clock signal CLK by dividing the frequency of the interrogation signal by a predetermined amount to generate a system clock. The full wave rectifier circuit 212 rectifies the received interrogation signal, and produces a direct current (DC) power supply VOUT. The DC power supply VOUT is then connected to the voltage regulator circuit 216, power on reset circuit 220, and the memory portion 148. The voltage regulator 216 regulates the DC power supply VOUT signal to provide a regulated output signal VDD and VSS to power other components within the transponder integrated circuit 104. The voltage regulator circuit 216 also provides a DC bias current IBP which is used in a sense amplifier located within the memory portion 148. The power on reset circuit 220 outputs a signal POR when the input signal VOUT reaches a predetermined threshold level. This is used to ensure that enough power is obtained to operate the transponder properly and to verify that all of the components start operation from a known state.

Figure 3:
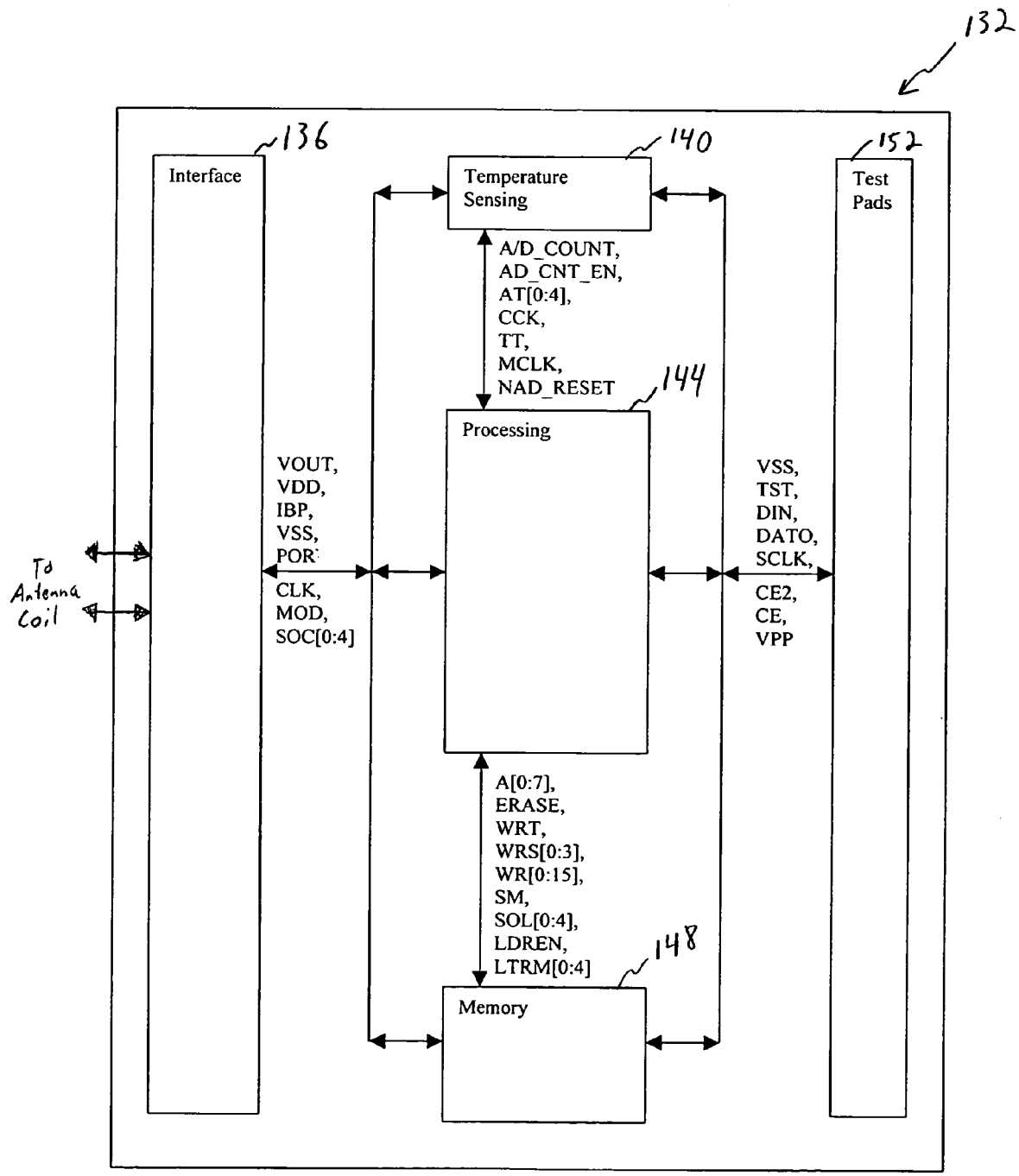
FIG. 3 is a block diagram illustration indicating major signals communicated between components of a temperature sensing transponder of an embodiment of the present invention.

Referring now to the block diagram illustration of FIG. 3, the major signals communicated between different portions of the transponder integrated circuit are now described. The major signals communicated between the interface portion 136 and remaining portions of the integrated circuit include VOUT, VDD, IBP, VSS, POR, CLK, MOD and SOC[0:4], as were described with reference to FIG. 2.

The major signals communicated between the temperature sensing portion 140 and processing portion 144 include A/D_COUNT, AD_CNT_EN, AT[0:4], CCK, TT, MCLK and NAD_RESET. A/D_COUNT is a digital value representing temperature-proportional analog current which is generated by a temperature sensor within the temperature sensing portion 140. The temperature sensor and the A/D converter will be described in more detail below with reference to FIG. 4 and FIG. 5. AD_CNT_EN is the A/D converter enable signal. When the AD_CNT_EN signal is high, the A/D converter is selected to convert temperature into a digital value A/D_COUNT. AT[0:4] is an analog temperature trim value used to trim the analog current portion of the temperature sensor circuitry. The value is determined during the temperature calibration process, which will be described in further detail in FIG. 9. CCK is the clock used by the A/D converter in the temperature sensing circuit. TT is the signal used to indicate transmission of temperature data. Temperature data is transmitted when TT is high. MCLK is the clock used by the A/D converter and it is equal to CLK/2. NAD_RESET is the active low A/D reset signal and is used to reset the A/D converter before a conversion.

The major signals communicated between processing portion 144 and memory portion 148 include A[0:7], ERASE, WRT, WRS[0:3], WR[0:15], SM, SOL[0:4], LDREN and LTRM[0:4]. A[0:7] is an 8-bit address bus for accessing the memory portion 144. ERASE is the signal for erasing the memory, and the memory is erased when ERASE is high. WRT is the signal for writing into the memory, and the memory may be written to when WRT is high. WRS[0:3] are write select bits used to select the row of memory to write when used in combination of active high WRT. WR[0:15] are digital test register bits. SM is the single memory bit output from the memory. SOL[0:4] are raw bits from the memory that indicate antenna tune trim values. LDREN is logic drive enable. When LDREN is high, the antenna tune trim bits from the digital test register are output from the memory. LTRM[0:4] are logic trim bits used to drive antenna tune selection when LDREN is high.

The major signals communicated between test pads 152 and processing portion 144 and memory portion 148 include VSS, TST, DIN, DATO, SCLK, CE2, CE, VPP. VSS is a ground signal. TST is an input signal used to decode the control register into meaningful codes. The rising edge of TST is used to generate a global reset on the chip to synchronize modulation output with CLK. SCLK is the serial clock signal used to shift in input data (DIN) or shift out output data (DATO) for the processing portion 144. DIN is the input data used in combination with SCLK to select test modes as well as program the memory portion 148. DATO is the output data used in combination with SCLK to shift out digital test register bits. CE2 is a chip enable signal for the processing portion 144, which is used to activate a test mode. CE is the chip enable signal for the memory portion 148, which is used in combination with WRT/ERASE to write into/erase the memory portion 148. VPP is the high voltage power supply for programming the memory portion 148.

Figure 4:
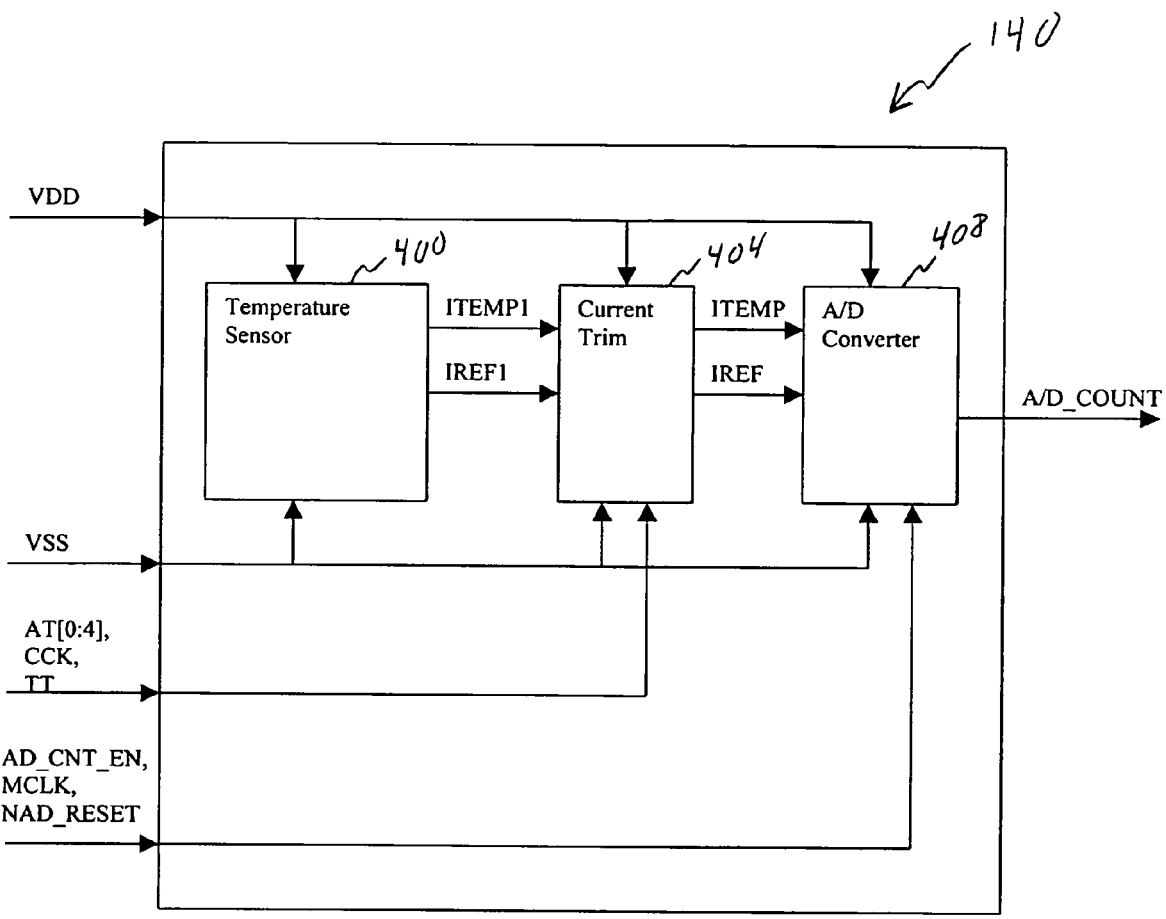
FIG. 4 is a block diagram illustration of a temperature sensing circuit of an embodiment of the present invention.

Referring now to FIG. 4, a block diagram illustration of the temperature sensing portion 140 is now described. The temperature sensing portion 140 includes a temperature sensor 400, a current trim circuit 404, and an A/D converter circuit 408. The temperature sensor 400 utilizes the temperature-proportional characteristic of P-N junction voltage to sense the temperature of the P-N junction. It has been known that a semiconductor P-N junction, in a bipolar junction transistor for example, exhibits a strong thermal dependence. The base-emitter voltage of a bipolar junction transistor decreases almost linearly with temperature. The temperature coefficient is dependent on the emitter current density, with lower current densities associated with higher temperature coefficients. A temperature-proportional current ITEMP1 is derived from the corresponding P-N junction voltage. A temperature-independent current IREF1 is derived from the bandgap reference voltage. The details of a basic temperature sensor will be described in more detail in connection with FIG. 5.

The current trim circuit 404 trims IREF1 and ITEMP1 to IREF and ITEMP respectively, based on the input signal AT[0:4], which is delivered from the memory portion 148. The A/D converter circuit 408 converts the ratio of ITEMP/IREF to a digital count value A/D_COUNT.

Figure 5:
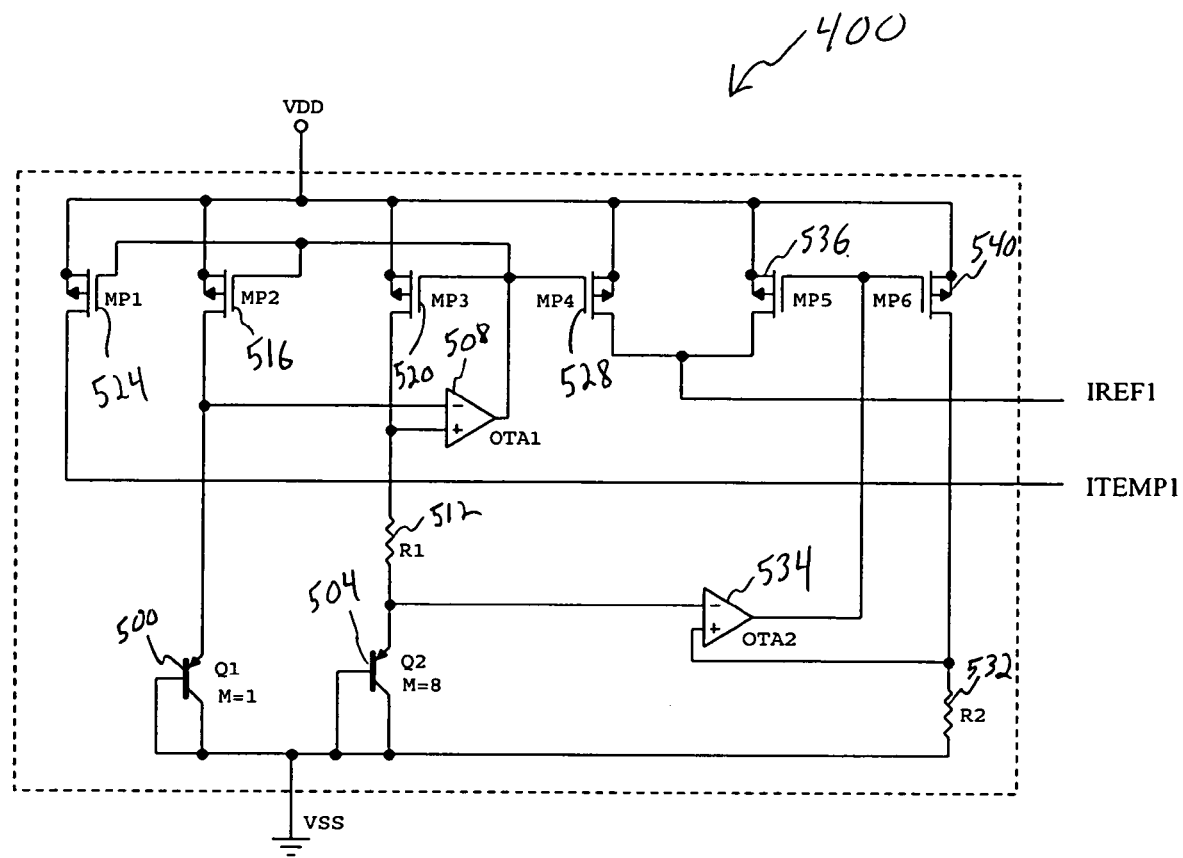
FIG. 5 is a circuit diagram illustrating a temperature sensor of one embodiment of the present invention.

Referring now to FIG. 5, a schematic illustration of a temperature sensor circuit 400 of one embodiment of the present invention is described. The temperature sensor circuit 400 includes a first bipolar junction transistor portion Q1 500, and a second bipolar junction transistor portion Q2 504. The first bipolar junction transistor portion Q1 500, in this embodiment, consists of one (M=1) PNP transistor while the second bipolar junction transistor portion Q2 504 consists of 8 (M=8) PNP transistors. The second bipolar junction transistor portion Q2 504 having eight transistors results in the collective surface area of the base-emitter P-N junctions of Q2 504 being eight times that of Q1 500. The difference between two base-emitter voltages is in a first-order approximation linearly proportional to absolute temperature, and the voltage can be written as $V=(kT/q)\ln(r)$, where r is the emitter current density ratio, T is temperature, k is Boltzmann's constant, and q is the magnitude of electronic charge. Theoretically, any ratio r which is greater than one may be used, with a preferable range of r being 4–16. A value of r=8 is used in the embodiment of FIG. 5 because it forms a symmetric pattern, eight transistors of Q2 504 surround one transistor of Q1 500, in the physical layout of the integrated circuit. The symmetry also helps to minimize offset due to the layout pattern. On the physical layout of the integrated circuit, the surface area of Q2 in this embodiment is approximately 8 times of the surface area of Q1. Alternatively, the second bipolar junction transistor portion 504 may include a single, or multiple, transistors having a base-emitter P-N junction which has approximately eight times the surface area as the base-emitter P-N junction of the first bipolar junction transistor portion 500. Other alternatives, and ratios of P-N junction surface area, may also be used, providing that they provide a suitable ratio of emitter current density for the bipolar junction transistor portions 500, 504.

The emitter of Q1 500 is connected to an offset compensated operational transconductance amplifier OTA1 508. The emitter of Q2 504 is connected to a resistor R1 512, which is connected to the amplifier OTA1 508. Two P-channel metal-oxide semiconductor field-effect transistors MP2 516 and MP3 520 form a current mirror circuit that regulates the emitter current density for Q1 500 and Q2 504.

By keeping the emitter current density in each bipolar junction transistor portion 500, 504 at a constant ratio (e.g. 1:8), the difference in the base to emitter voltage (VDBE=VBE1−VBE2) of the two bipolar junction transistor portions 500, 504 will be directly proportional to the absolute temperature of the transistors. The difference in the base to emitter voltages is reflected as the voltage across the resistor R1 512. It will be understood that other emitter current density ratios could be implemented in a similar fashion, so long as a reliable difference in the base to emitter voltage of the bipolar junction transistor portions 500, 504 is obtained which is directly proportional to the absolute temperature of the transistors.

The temperature-proportional characteristic of VDBE enables IC transistors to produce output signals that are proportional to absolute temperature. The output signal can be either in voltage configuration VDBE or in current configuration IDBE where IDBE=VDBE/R1. The temperature-proportional current IDBE can be mirrored as ITEMP1 using the current mirror circuit formed by MP1 524 and MP3 520. Similarly, the current through MP4 528 is also the mirror current of MP1 524 and MP3 528.

In order to measure absolute temperature of the temperature sensor circuit 400, a temperature-independent bandgap reference is needed. The temperature-independent bandgap reference voltage (VREF1) in this embodiment is obtained using VBE2, VDBE, and a ratio of the resistance of the resistor R1 512, and the resistor R2 532, according to: VREF1=VBE2+VDBE(R2/R1). The resistor R2 532 is connected to amplifier OTA2 534. The bandgap reference voltage can be transformed into a reference current IREF1, where IREF1=VREF1/R2. The reference current can be further expressed as IREF1=(VBE2/R2)+(VDBE/R1), which is the sum of the current through MP5 536 and the current through MP4 528. The current through MP5 536 is the mirror current of MP6 540, which is equal to the current VBE2/R2. The current through MP4 is the mirror current of MP3, which is equal to the current VDBE/R1. IREF and ITEMP1 can be read by the A/D converter 408. In one embodiment, the temperature sensor circuit 400 is fabricated on a silicon integrated circuit, however, other types of semiconductor materials may be used, such as gallium-arsenide or germanium, for example. It should be understood that numerous other alternatives exist for such a temperature sensor, such as a temperature sensor that employs more or fewer transistors in the bipolar junction transistor portions 504, 508, or a temperature sensor which utilizes diodes rather than bipolar junction transistors. In such an alternatives, the voltage drop on the P-N junctions may be used to determine the actual temperature of the transponder.

Figure 6:
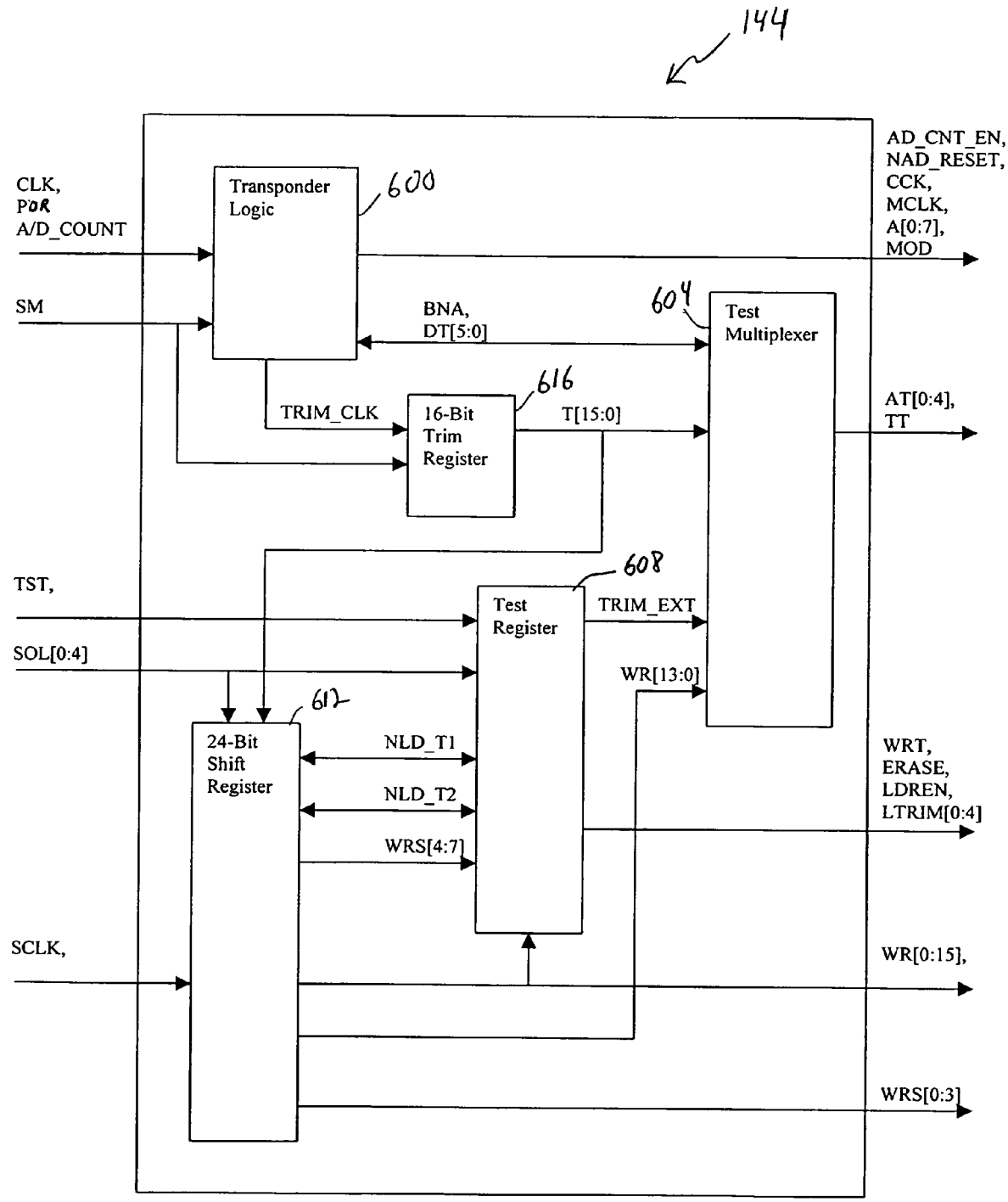
FIG. 6 is a block diagram illustration of processing circuitry for a temperature sensing transponder of one embodiment of the present invention.

Referring now to FIG. 6, a block diagram illustration of the processing portion 144 is now described. The processing portion 144 includes a transponder logic circuit 600, a test multiplexer circuit 604, a test register circuit 608, a 24-bit shift register circuit 612 and a 16-bit trim register circuit 616. The external signals which are received at the processing portion 144 include CLK, POR, A/D_COUNT, SM, TST, SOL[0:4], and SCLK. The processing portion 144 delivers external signals to other portions of the transponder, which include CE2, DIN, AD_CNT-EN, NAD_RESET, CCK, MCLK, A[0:7], MOD, AT[0:4], TT, WRT, ERASE, LDREN, LTRM[0:4], WR[0:15], DATO and WRS[0:3]. Details of these signals were discussed in connection with FIG. 3.

Internal signals within the processing portion 144 include BNA, DT[5:0], T[15:0], TRIM_CLK, TRIM_EXT, WR[13:0], NLD_T1, NLD_T2 and WRS[4:7]. BNA is the signal used to select either a B mode transponder (when BNA is high) or an A mode transponder (when BNA is low). The A and B mode transponder setting corresponds to the type of response signal which is transmitted by the transponder, namely if the required response signal from the transponder is an FDXA type signal, the A mode is selected. Likewise, if the required response signal from the transponder is an FDXB type signal, the B mode is selected. FDXA and FDXB transmissions are ISO standard transmission formats, and will be discussed in more detail below. DT[5:0] are digital temperature trim bits. These digital temperature trim bits are set based on a calibration of the temperature sensing portion 140, and will be discussed in more detail below. T[15:0] are internal trim bits. TRIM_CLK is the trim clock. TRIM_EXT is the trim extract. WR[13:0] are digital test register bits. NLD_T1 signals loading for T[15:0] into a shift register when active low. NLD_T2 signals loading for SOL[0:4] into a shift register when active low. WRS[4:7] are test modes select bits.

The transponder logic circuit 600 generates A/D converter control signals AD_CNT_EN and NAD_RESET, memory addresses A[0:7], clock signals CCK and MCLK, and a modulation signal MOD. The test multiplexer circuit 604 multiplexes either T[15:0] or WR[13:0] onto trim buses AT[0:4], DT[5:0], and nets BNA, TT based on the state of TRIM_EXT. When TRIM_EXT is low, T[4:0]=AT[4:0], T[10:5]=DT[5:0], T14=TT and T15=BNA. When TRIM_EXT is high, WR[4:0]=AT[4:0] and WR[[10:5]=DT[5:0]. WR[13:11] and T[13:11] are spare bits, which may be used for specialized applications. In one embodiment, during normal operation TRIM_EXT is always low and T[15:0] drives the buses and nets, and only during test modes is TRIM_EXT temporary driven high, cleared on reset or writing a clear control code.

The test register circuit 608 contains logic used to decode WRS[4:7] into specific test modes. The test modes are used to write and erase the memory, force the MOD line to be inactive, turn off the A/D converter, and load trim values into the 24 bit shift register. Details of the sequence of testing, tuning, calibrating and programming will be described in connection with FIG. 8.

The 24-bit shift register 612 shifts in 8 control bits and 16 data bits used to program row values for the memory, selects test modes, and generally controls the test register circuit 608. The 16-bit trim register 616 outputs trim bits T[15:0] with the input signal SM. SM is the single memory bit output from the memory portion 148.

Figure 7:
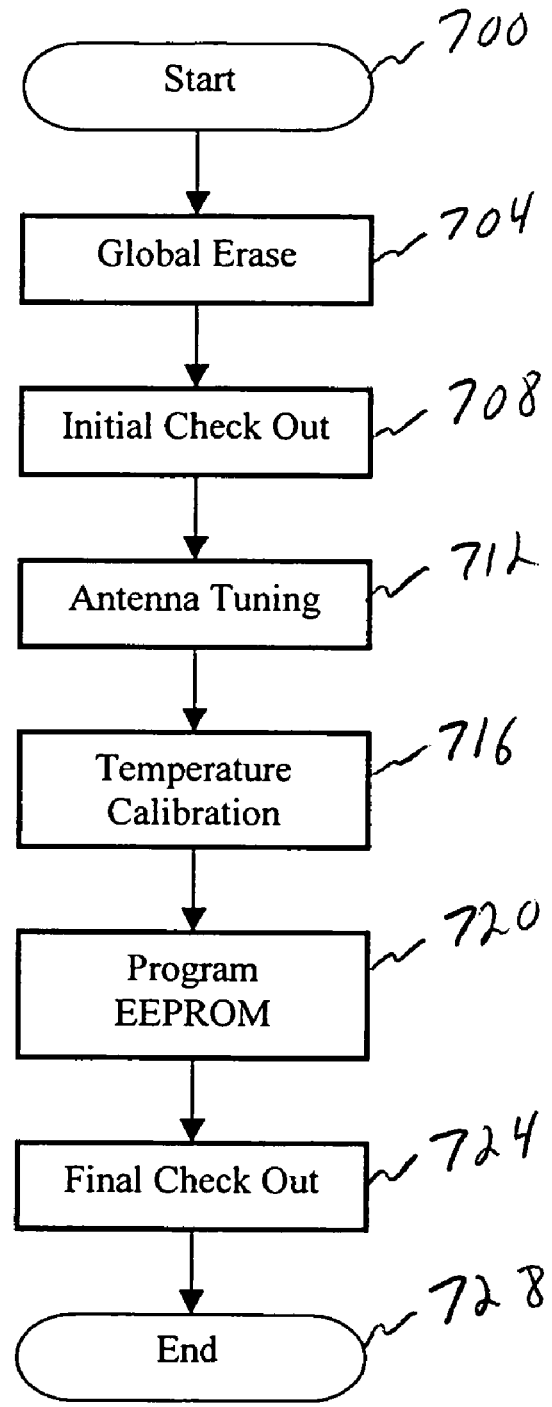
FIG. 7 is a flow chart diagram illustrating the operational steps for testing and calibrating a temperature sensing transponder of one embodiment of the present invention.

Referring now to FIG. 7, a flow chart illustration of the operations for testing, tuning, calibrating and programming of the transponder integrated circuit is now described. In one embodiment, the operations associated with FIG. 7 are performed using an automatic tester during the manufacturing process, while the integrated circuits are still on the semiconductor wafer used for fabrication. Testing, calibration, tuning and programming may thus be completed relatively quickly and easily by the automatic test equipment, eliminating the need to individually test and calibrate each completely packaged transponder. Alternatively, the operations associated with FIG. 7 may be performed at other times, such as after assembly of the integrated circuit into packages, or after the integrated circuits are cut into dies but before packaging. In one embodiment, the sequence is divided into six steps. Initially, the tester starts the sequence, as noted by block 700. At block 704, a global erase is performed to carry out an initial erase of the memory portion 148 to all zeros. The memory portion is any suitable memory device, such as a programmable read only memory. In one embodiment, the memory portion 148 is an electronically erasable programmable read only memory (EEPROM or flash memory).

An initial check out, to determine if the die is functioning and further testing and calibration is warranted, is carried out, as noted by block 708. At block 712, antenna tuning to tune the antenna to its optimal efficiency by trimming its capacitance is performed. Temperature calibration to calibrate the temperature sensor of the transponder integrated circuit is performed, according to block 716. Next, at block 720, the memory portion is programmed to store a unique identification associated with the transponder, transponder selection code to select a type A or type B transponder, analog temperature trim value and digital temperature trim value. Finally, according to block 724, a final check out is performed to ensure that the appropriate data has been programmed to memory and that the calibration has been carried out appropriately. The sequence is then complete, as noted by block 728. It will be understood that the above order in which the sequence is performed may be modified, and steps may be combined, where appropriate for certain applications.

The procedure, in one embodiment, for chip testing involves powering the chip by applying a 134 kHz sine wave carrier to antenna pins, which are included in the test pads. A wafer probe card that contains a transformer circuit and a demodulator circuit serves as an interface between the 134 kHz sine wave source, the transponder integrated circuit, and the automatic tester. The 134 kHz carrier signal is rectified by the transponder integrated circuit to generate the chip VDD. The carrier frequency is also used as the internal chip clock frequency CLK for the digital logic. After a sufficient delay to allow the chip power to stabilize, a serial word is shifted into the chip test register. The data is presented to a test pad as the signal DIN and clocked by serial data clock SCLK. The data clock frequency can be a 1× to 4× multiple of the carrier frequency CLK. In one embodiment, the serial word consists of a concatenated 8-bit control word, and a 16-bit data word. The 8-bit control word represents the test mode and the 16-bit data word contains the input data. The action performed by the chip, when the test enable pin associated with signal CE2 goes high, is determined by the contents of the 8-bit control word.

Figure 8:
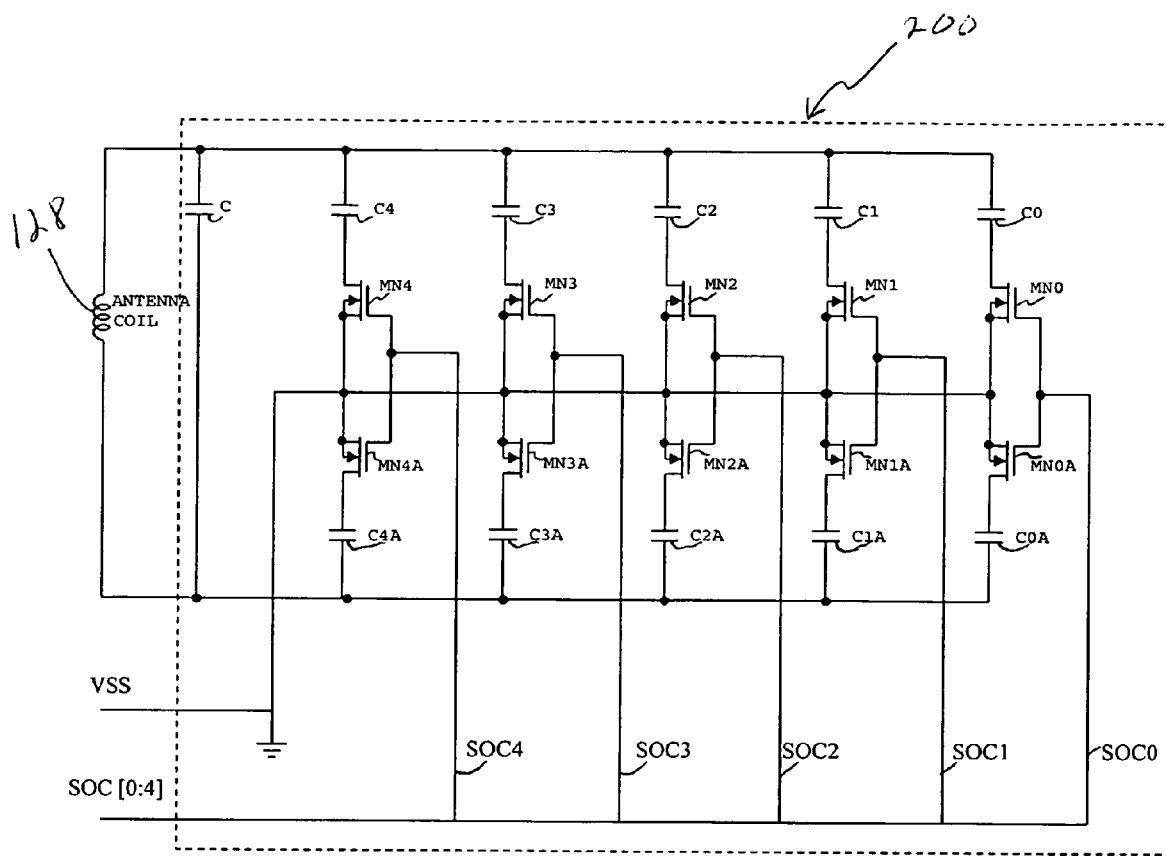
FIG. 8 is a circuit diagram illustrating a tune circuit of one embodiment of the present invention.

Referring now to FIG. 8, a schematic illustration of the antenna tune circuit 200 is now described. The antenna tune circuit 200 consists of a fixed capacitor C and five sets of trim capacitors, a first set C0 and C0A, a second set C1 and C1A, a third set C2 and C2A, a fourth set C3 and C3A, and a fifth set C4 and C4A, that can be selected by the input trim signal SOC[0:4]. In one embodiment, the capacitance of C is 257 pF, and the capacitances of C0 and C0A are 2 pF, C1 and C1A are 4pf, C2 and C2A are 8 pF, C3 and C3A are 16 pF, and C4 and C4A are 32 pF. The signals SOC[0:4], when active high, turn on the corresponding N-channel MOSFETs. MOSFETs MN0 and MN0A are turned on when SOC0 is active high, MOSFETs MN1 and MN1A are turned on when SOC1 is active high, MOSFETs MN2 and MN2A are turned on when SOC2 is active high, MOSFETs MN3 and MN3A are turned on when SOC3 is active high, and MOSFETs MN4 and MN4A are turned on when SOC4 is active high. When the N-channel MOSFETs are on, the trim capacitors which are associated with the MOSFETs are added to the fixed capacitor C. For an example, if SOC[0:4]=01010, an additional trim capacitance of 20 pF (0×2 pF+1×4 pF+0×8 pF+1×16 pF+0×32 pF) is added to the fixed 257 pF capacitance. SOC[0:4] can vary between 00000 to 11111, representing an additional 0 pF to 62 pF trim capacitance to the 257 pF capacitance. The total tuned capacitance (CT) can then be trimmed to a specific value between 257 pF to 319 pF. It will be understood that other values of the capacitors may be used, depending upon the application in which the transponder is to be used, as will be readily understood by one of ordinary skill in the art.

The tune circuit 200, which is associated with the antenna 128, typically comprises an inductance, designed as a coil, and a capacitance, formed by means of a capacitor. The antenna 128 is tuned to its optimal efficiency if the tuned capacitance (CT) matches the inductance of the antenna coil 128 to provide an optimal antenna voltage. The antenna tuning process is performed by the automatic tester during the wafer probe operation. A wafer probe card that contains a demodulator circuit will serve as an interface between the 134 kHz sine wave source, the transponder integrated circuit 132, and the automatic tester.

In one embodiment, a specific 8-bit control word that represents antenna tuning test mode is first shifted into the chip test register. The control word disables the modulation to allow for more accurate trimming of the on chip capacitor. The demodulator circuit has a DC output that is proportional to the peak amplitude of the antenna voltage. The tuning procedure is to shift in a trial 5-bit antenna tune word (SOC[0:4]), bring the test enable pin CE2 high, record the value of the demodulator DC output, then bring the test enable pin low. This procedure continues until an optimal 5-bit antenna tune word is found that produces the maximum DC output from the demodulator. A successive approximation procedure is used to produce the fastest convergence on the optimal antenna tune word. The optimal antenna tune word is then stored into the chip memory.

Figure 9:
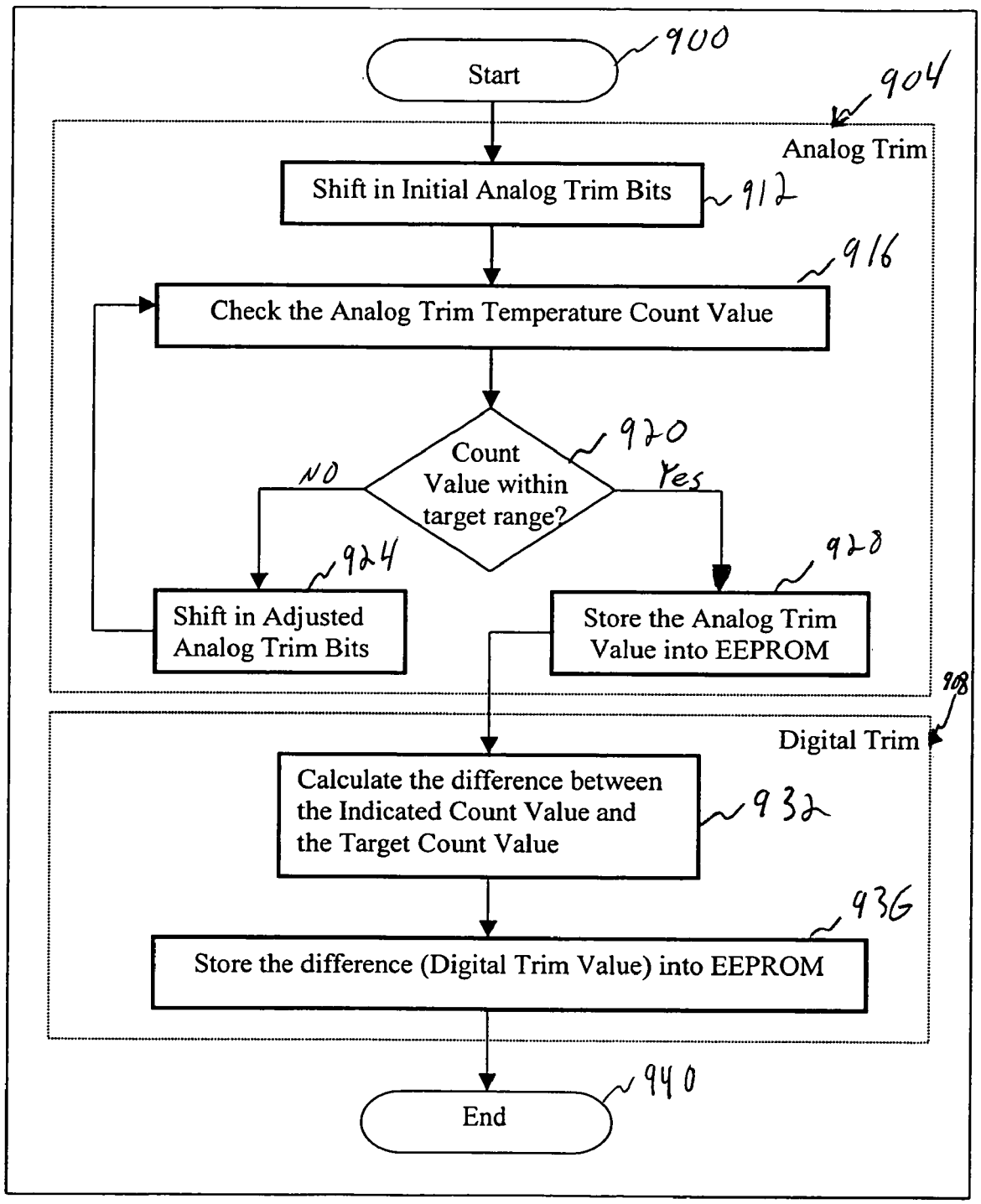
FIG. 9 is a flow chart diagram illustrating the operational steps for calibrating a temperature sensing transponder of one embodiment of the present invention.

Referring now to the flow chart illustration of FIG. 9, the operations for performing temperature calibration by the automatic tester during the wafer probe operation are now described. As the physical parameters of transistors can vary, the magnitude of the difference in base to emitter voltages can also vary for different pairs of transistors. In order to ensure that the temperature output by the transponder is the correct temperature, it is necessary to calibrate the circuit. Variation in the physical parameters of the transistors are the result of typical processing variations in the fabrication of the integrated circuit, and are well understood in the art. The temperature calibration is performed, in one embodiment, during the testing of the temperature sensing transponder integrated circuit. The wafer, and thus the transponder integrated circuit, is kept at a predetermined, known temperature on the tester chuck throughout the whole calibration process. The objective of the temperature calibration is to calibrate the chip temperature sensor such that at a known temperature, a given digital word value A/D_COUNT is telemetered by the chip to the reader.

The temperature calibration is initiated at block 900, and is performed in two major steps. The two major steps are analog trim 904 and digital trim 908. During the analog trim, the analog portion of the temperature sensor is adjusted by the tester such that the proportional to temperature current generated by the temperature sensor is able to span a predetermined temperature range. Initially, according to block 912, the tester first shifts in an initial guess for the analog trim bits AT[0:4], which is based on an expected result based on the predetermined temperature of the test chuck. The analog trim temperature count value is checked, as noted by block 916. The check is performed when the test enable pin is brought high, resulting in a telegram being sent by the transponder integrated circuit to the wafer probe card's demodulator circuit. The demodulated telegram is decoded by the tester to find the 8-bit temperature count value. The tester, as noted by block 920, compares this temperature count value to a predetermined target range for the count value.

If the temperature count value is not within the predetermined target range, the tester adjusts the analog trim bits, and shifts in the adjusted for the analog trim bits AT[0:4], and the operations associated with blocks 916 and 920 are repeated. If, at block 920, the tester determines that the temperature count value is within the predetermined target range, this analog trim temperature count value is recorded by the tester and the analog trim value AT[0:4] is programmed into the memory, as noted by block 928. In one embodiment, the predetermined target range for the temperature count value is ±8 counts. The analog trim value may be used to adjust the gain of the amplification portion of the temperature sensor, to adjust an offset, or both. If the analog trim value is used to adjust the gain of the amplification portion, such as by taking a product of the trim value and the analog trim temperature count, the A/D converter would be able to output a larger or smaller range of temperature values. If the analog trim value is used to adjust an offset, the value of the analog trim value may be simply added or subtracted to the analog trim temperature count, resulting in a consistent range of temperature values able to be output by the A/D converter. Adjustments to both the gain and offset may be used in certain applications which require a larger temperature range to be transmitted by the transponder.

The initial operation in the digital trim step, as noted by block 932, is a calculation of the difference between the target count value and the indicated count value from block 928 as computed by the tester. At block 936, this difference value is programmed into the memory as the digital trim value DT[5:0]. Thus, the calibrated temperature can be computed using the analog and digital trim values. The calibration operation is then complete, as noted by block 940.

While the above discussion with reference to FIG. 9 has been in the context of determining a calibration for a temperature of a transponder, it will be understood that similar techniques may also be used to calibrate a transponder which is capable of detecting other body characteristics, rather than body temperature. For example, a transponder may include a sensor which is capable of sensing pressure. In such a case, the sensor may output an analog signal, which is read by an analog to digital converter, and which is calibrated in a similar manner as described with reference to FIG. 9. Furthermore, the transponder may be embedded in other objects rather than an animal.

Figure 10:
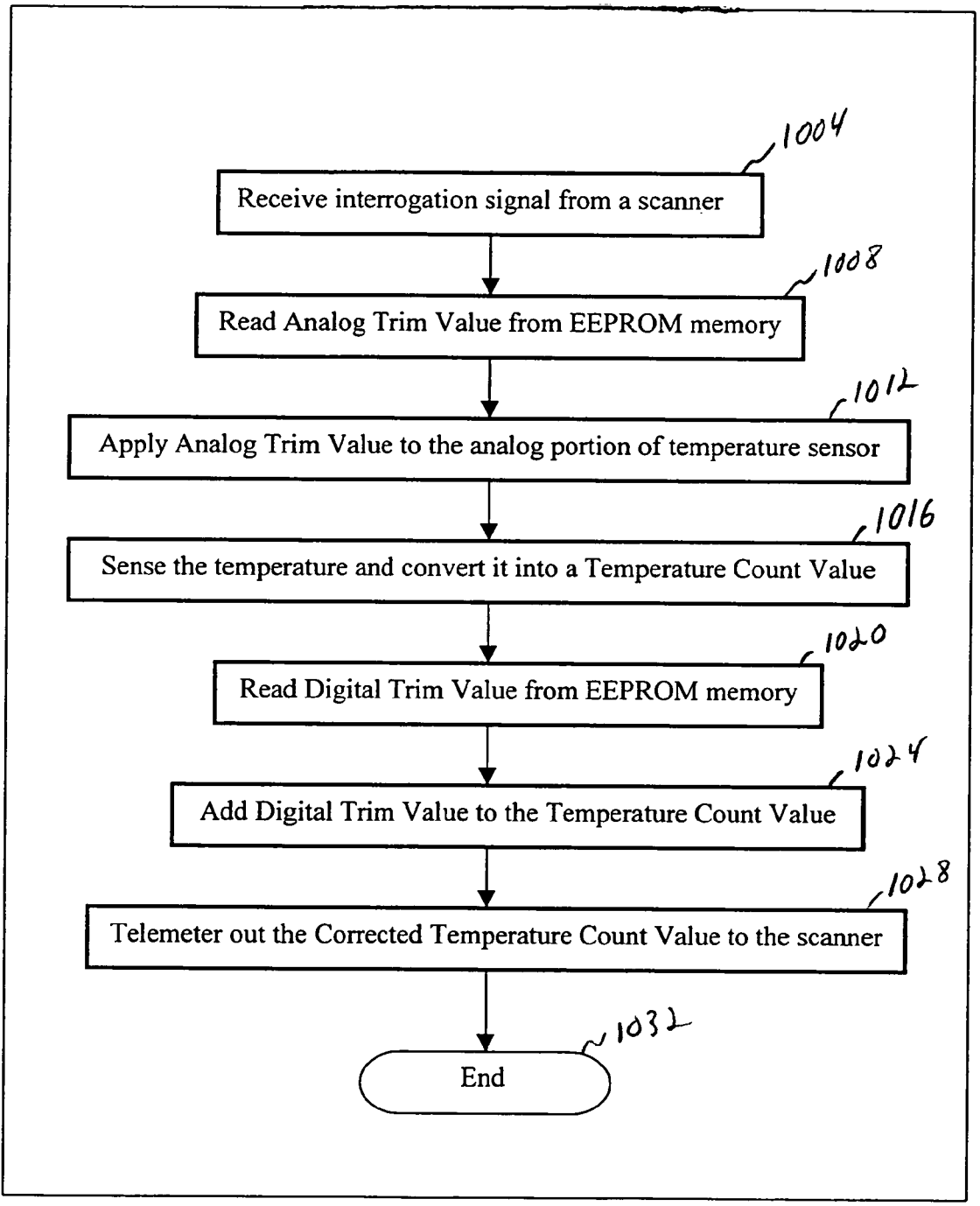
FIG. 10 is a flow chart illustration of the operational steps for transmitting a temperature value from a temperature sensing transponder of one embodiment of the present invention.

Referring now to the flow chart illustration of FIG. 10, the operations associated with obtaining and transmitting a temperature value from the transponder is now described. Initially, according to block 1004, the transponder receives an interrogation signal from a scanner and rectifies the signal to generate the chip VDD power supply. During the "power on reset" when the interrogation field is first applied to the chip antenna coil, the analog trim value AT[0:4] determined from calibration process is read from memory, as noted by block 1008. The analog trim value is applied to the analog portion of the temperature sensor, as noted by block 1012. The temperature sensor senses the temperature of the integrated circuit and converts the analog current ITEMP into a digital count value, according to block 1016.

When it is time to telemeter the temperature data, the processing portion reads the digital trim value from the memory, as noted by block 1020. A serial digital adder within the processing portion takes the digital count value output from the A/D converter and adds the digital trim value, as noted by block 1024. The corrected digital temperature count value is then telemetered to the reader, as noted by block 1028. The operation is then complete, as noted by block 1032. Accordingly, neither of the analog and digital trim values are telemetered to the reader. The correction is automatically made within the transponder before the final temperature digital count value is telemetered to the reader.

When transmitting information to the scanner, the transponder, in one embodiment, transmits a data sequence according to the ISO Standard 11785. ISO standard 11785 is a well known standard which is widely used in telemetering identification data from a transponder to a reader. The ISO standard includes two distinct transmission types, FDXA and FDXB, for transmitting information from a transponder to a reader. In one embodiment, the transponder 104 can be programmed to transmit using either FDXA or FDXB, by setting an A or B mode flag within the transponder integrated circuit.

Figure 11:
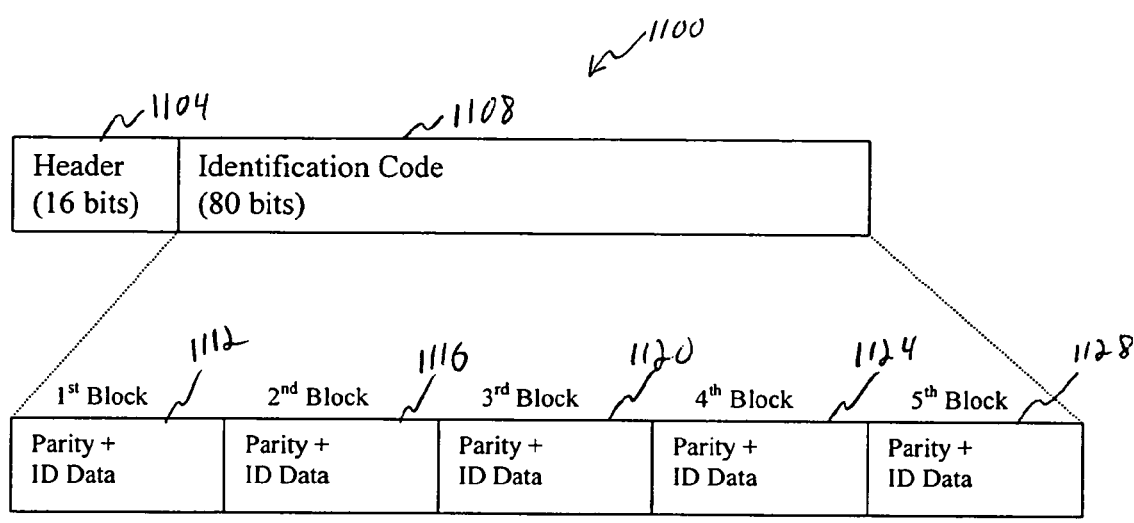
FIG. 11 is a block diagram illustration of an ID telegram for transmitting an identification code using a FDXA transmission.

When transmitting temperature and identification information from the transponder 104 using an FDXA transmission, the transponder 104 first includes identification information in one or more FDXA transmissions, and then temperature information in one or more FDXA transmissions. In this embodiment, the transponder transmits the identification information stored in the memory 148 in an identification telegram. The FDXA signal containing the identification information includes several information fields, and is defined by the ISO 11785 standard. The signal is transmitted at 125 kHz, using amplitude modulation frequency shift keying (AM-FSK), which is read by the reader. The signal uses manchester encoding, and has a bit rate of 1250 bits/second. The ID telegram structure 1100, as illustrated in FIG. 11, includes two information fields. A header 1104, is included as the first 16 bits of the ID telegram 1100. Following the header 1100 is an 80 bit identification code field 1108, having 70 identification bits and 10 parity bits. The total structure is thus 96 bits. Because the signal uses Manchester encoding, the actual number of information bits transmitted in the telegram structure is reduced because the manchester encoding includes clock information, as is well understood in the art.

Within the identification code field 108 are five data blocks. A first data block 1112 contains parity data and a first portion of identification data. The parity data includes two binary bits, and the first portion of identification data contains the first 14 identification bits from the identification information stored in memory 148. A second data block 1116 contains parity data and a second portion of identification data. The parity data includes two binary bits, and the second portion of identification data contains identification bits 15 through 28 from the identification information stored in memory 148. A third data block 1120 contains parity data and a third portion of identification data. The parity data includes two binary bits, and the third portion of identification data contains identification bits 29 through 42 from the identification information stored in memory 148. A fourth data block 1124 contains parity data and a third portion of identification data. The parity data includes two binary bits, and the third portion of identification data contains identification bits 43 through 56 from the identification information stored in memory 148. A fifth data block 1128 contains parity data and a fifth portion of identification data. The parity data includes two binary bits, and the fifth portion of identification data contains identification bits 57 through 70 from the identification information stored in memory 148. In one embodiment, the identification code stored in memory 148 is a 10-digit hexadecimal number with the odd digits being hexidecimal 8 or less, allowing manchesterencoding in three bits, while the even digits are encoded using four Manchester encoded bits, thus allowing any hexadecimal digit.

Figure 12:
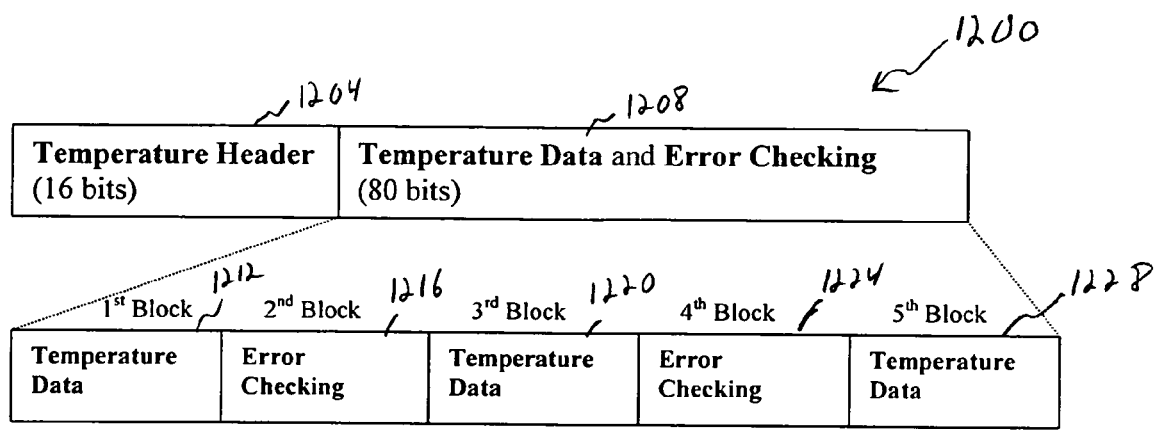
FIG. 12 is a block diagram illustration of an ID telegram for transmitting temperature information using a FDXA transmission.

In this embodiment, the transponder 104 also transmits information related to temperature to the scanner in a temperature telegram. The temperature information is encoded in a temperature telegram structure 1200, as illustrated in FIG. 12. The temperature telegram structure 1200 includes several data fields. First, the temperature telegram structure 1200 has a header field 1204 which has 16 bits. Following the header field 1204 is a temperature data and error checking field 1208. The temperature data and error checking field contains 80 bits, and is divided into five separate data blocks. A first data block 1212 contains 16 temperature data bits, which is 8 manchester encoded data bits. A second data block 1216 contains 16 error checking bits, which in one embodiment are hexadecimal 5555. A third data block 1220 contains 16 temperature data bits, which is 8 manchester encoded data bits. A fourth data block 1224 contains 16 error checking bits, which in one embodiment are hexadecimal 5555. A fifth data block 1228 contains 16 temperature data bits, which is 8 manchester encoded data bits. The total structure is thus 96 bits.

Other alternatives may be used for the telegram structure used to transmit temperature information, such as, for example, the temperature information being contained in the first field, with the remainder of the telegram structure being filled with stuffing bits. If more or fewer bits are used to encode the temperature information, the fields in the telegram structure would be adjusted to accommodate the larger or smaller number of bits used for the temperature information. Furthermore, the total number of bits transmitted for a telegram structure to transmit temperature information may be adjusted. For example, a shorter telegram structure may be used which contains merely a header, temperature information, and error checking information.

When transmitting the identification information and the temperature information, the transponder uses an auto transmission format due to having to use two distinct telegram structures to transmit the identification and temperature information. In one embodiment, the transponder transmits a predetermined number of ID telegram structures 1100 having the identification information, and then transmits a predetermined number of temperature telegram structures 1200 having the temperature information. In one embodiment, three identification telegram structures 1100 are sent sequentially, and then one temperature telegram 1200 is sent. This is repeated as long as an interrogation signal is present at the transponder. In this embodiment, the headers in each of the ID telegram structures are unique which enables a scanner to determine whether the telegram contains identification or temperature information. For example, the identification telegram 1100 may include a header 1104 having the following binary bits in the header: 0101 0101 0001 1101. The temperature telegram structure 1200 may include the following binary bits in the header 1204: 1010 1010 1110 0010. Thus, the reader is able to determine the telegram structure type, temperature or identification, from the information contained in the header field. Using this type of transmission, a scanner which is not programmed to read temperature information may still be used to obtain identification information, because the identification information is contained in an ID telegram structure which is widely used and well known, namely a structure which conforms to the ISO 11785 standard.

In one embodiment, the reader and transponder operate in a full-duplex transmission, with the reader continuously transmitting an interrogation signal while also receiving the information from the transponder. In this embodiment, the transponder transmits the ID telegrams and temperature telegrams continuously, with no pauses between telegrams. However, it will be understood that other transmission schemes, such as burst transmissions, half-duplex, or pausing between telegrams could also be used.

Figure 13:
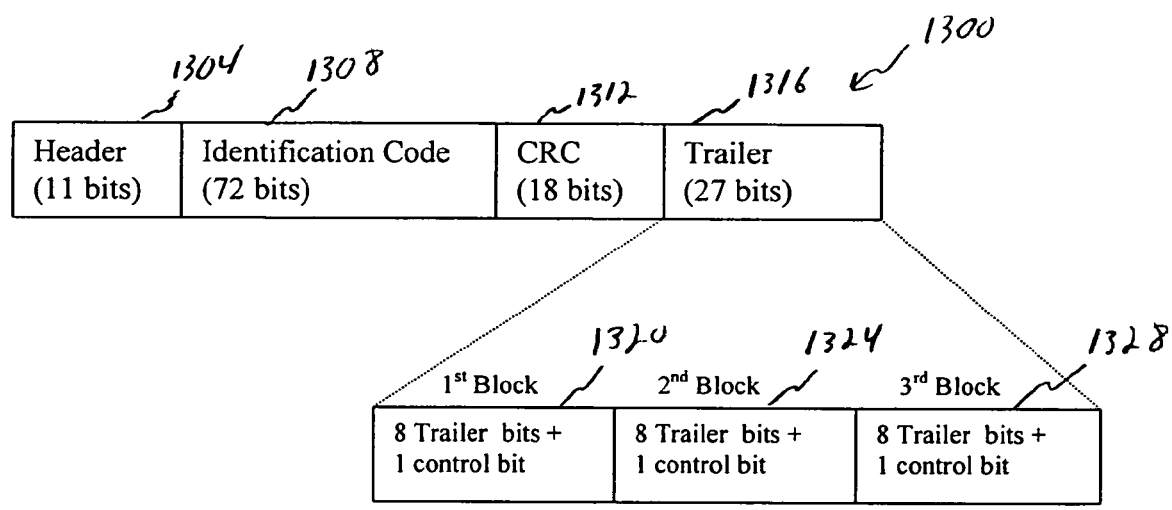
FIG. 13 is a block diagram illustration of an ID telegram for transmitting an identification code using a FDXB transmission.

When transmitting information to the scanner using an FDXB transmission, the transponder, transmits a data structure which contains both identification information as well as temperature information. The FDXB signal containing the identification information includes several information fields, and is also defined by the ISO 11785 standard. The signal is transmitted at 134.2 kHz, using amplitude shift keying (ASK) modulation, which is read by the reader. The signal uses modified differential bi-phase (DBP) encoding, and has a bit rate of 4194 bits/second. The ID telegram structure 1300, as illustrated in FIG. 13, includes several information fields. A header 1304, is included as the first 11 bits of the structure. Following the header 1304 is a 72 bit identification information field 1308. The identification information field 1308 contains 64 identification bits, and 8 control bits. Following the identification information field 1308 is an 18 bit CRC field 1312. The CRC field 1312 includes 16 CRC bits, and 2 control bits. Following the CRC field 1312, is a trailer field 1316, having 27 bits. The trailer field 1316 includes 24 trailer bits, and 3 control bits. The trailer field 1316 includes three data blocks. A first data block 1320 contains 8 trailer bits and one control bit. A second data block 1324 contains 8 trailer bits and one control bit. A third data block 1328 contains 8 trailer bits and one control bit. The total structure is thus 128 bits.

Figure 14:
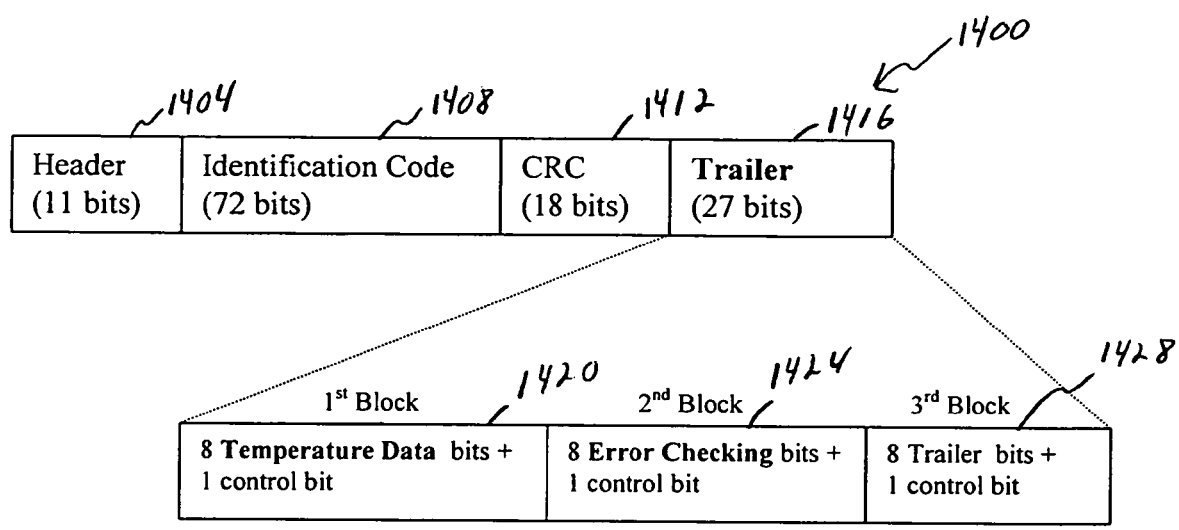
FIG. 14 is a block diagram illustration of an ID telegram for transmitting an identification code and temperature information using a FDXB transmission.

The transponder also transmits information related to temperature to the scanner. The temperature information is encoded in the ID telegram structure 1400, as illustrated in FIG. 14. The ID telegram structure 1400 includes several data fields. A header 1404, is included as the first 11 bits of the structure. Following the header is a 72 bit identification information field 1408. The identification information field contains 64 identification bits, and 8 control bits. Following the identification information field 1408 is an 18 bit CRC field 1412. The CRC field 1412 includes 16 CRC bits, and 2 control bits. Following the CRC field 1412, is a trailer field 1416, having 27 bits. The trailer field 1416 includes a first block 1420, a second block 1424, and a third block 1428, with each block having 9 bits. In this embodiment, the first block 1420 contains temperature information, and has 8 temperature bits, and one control bit. In this embodiment, the transponder encodes the digital temperature information into an 8 bit temperature data block, which can be used by the scanner to indicate the temperature of the transponder. The second block 1424 contains 8 error checking bits, and one control bit, and the third block 1428 contains 8 trailer bits and 1 control bit. The total structure is thus 128 bits. It will be understood that the temperature information may be encoded in the trailer field in alternative manners, such as, for example, the second block containing the temperature information, with the first and third trailer fields containing trailer or error checking bits and a control bit. Furthermore, if the temperature information is contained in more or fewer data bits, the trailer or error checking fields can be modified to contain the appropriate temperature information and error checking information.

When transmitting the identification and temperature information, the transponder uses an auto transmission format which acts to transmit the identification and temperature information continuously. Since the telegram structure contains both the identification and temperature information, it is not necessary to transmit a second telegram structure containing temperature information separately from a first telegram structure containing identification information, as is the case in an FDXA transmission. In one embodiment, the telegram structure includes a header having the following binary bits in the header: 00,000,000,001. The scanner is able to determine the telegram structure type from the information contained in the header field. As mentioned above, the scanner and transponder operate in a full duplex mode with no pause between successive telegrams, but could readily be modified to transmit in half-duplex mode or with pauses between telegrams.

Since the transponder transmits identification and temperature information in standardized form according to the ISO standard 11785, this allows readers which are not programmed to receive temperature information to continue to receive identification information. For example, a reader which is not capable of reading temperature information may be used to scan a transponder which is capable of transmitting temperature information according to one of the embodiments of the present invention. The transponder will transmit both the identification information, and the temperature information, as described above. If the reader is capable of reading standard FDXA or FDXB transmissions, the reader will be able to read the identification information contained in the transmissions. This allows for additional readers, which may not be capable of reading temperature information transmitted by the transponder, to be used for identification purposes, and can help identify a host even if a user is not using a reader which is capable of reading temperature information.

Figure 15:
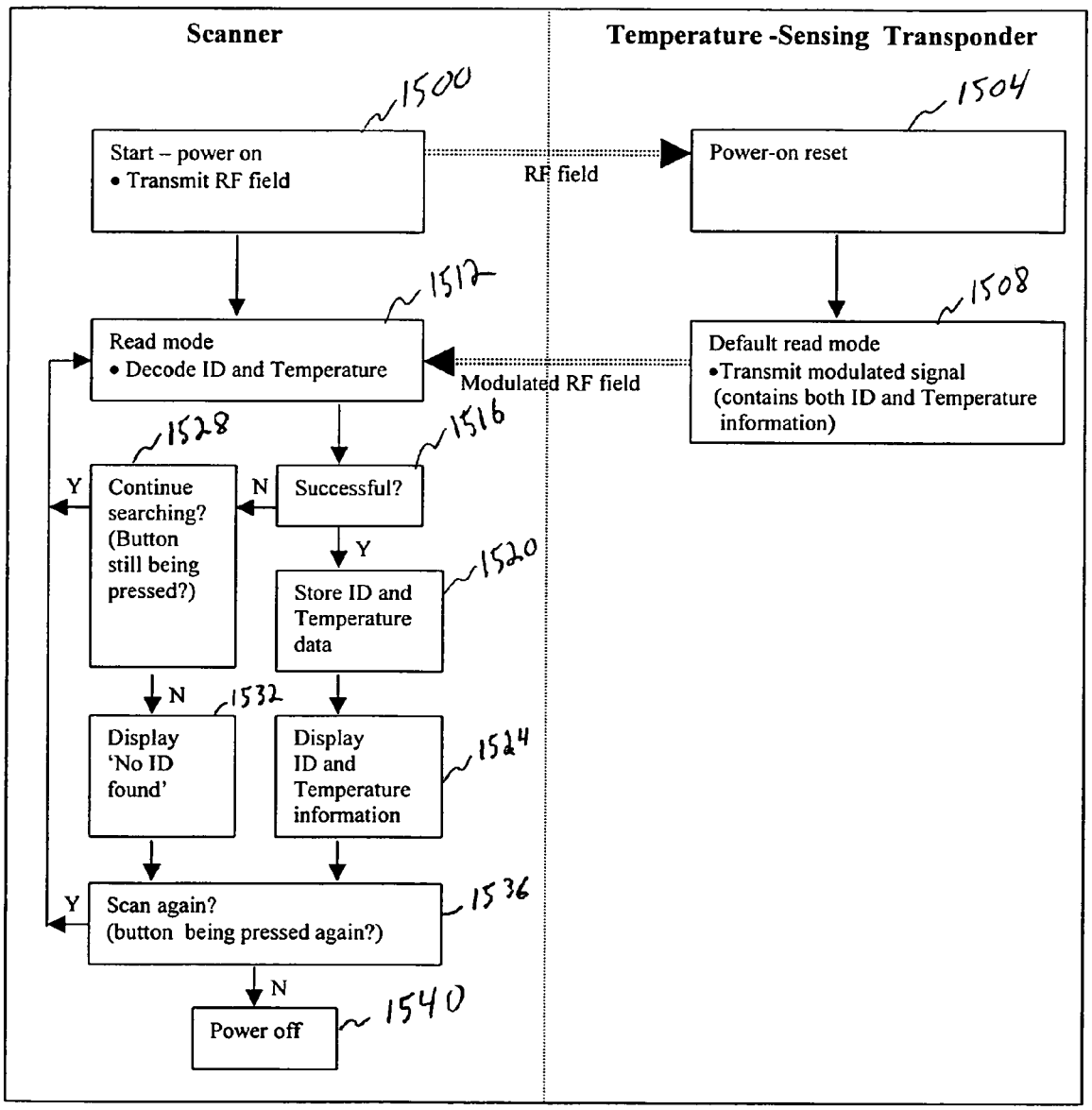
FIG. 15 is a flow chart illustration of the operational steps of a scanner and temperature sensing transponder system of one embodiment of the present invention.

With reference now to the flow chart illustration of FIG. 15, the operation of the scanner and the transponder will now be described. Initially, the scanner is used to transmit an RF field to the transponder, as noted by block 1500. The transponder receives the RF field, and uses energy from the RF field to power on the transponder integrated circuit, at noted by block 1504. When the transponder powers on, it resets all of the components, reads the configuration data for the transponder which is stored in memory, and determines the transponder type. The transponder type is, in one embodiment, an FDXA or an FDXB transponder, which is set during the initial programming and testing of the transponder. In another embodiment, the transponder can be reprogrammed, and change transponder types based on the reprogramming, i.e., from FDXA to FDXB or vice-versa. Such reprogramming may be performed in the field, using a reader which is operable to transmit a signal containing data which the transponder can read and store in memory. Such reprogramming techniques, including the readers and transponders associated therewith, are known in the art. Furthermore, a transponder may be programmed to recognize a flag from a reader, and transmit.

Once the transponder is powered on, it runs in a default read mode, as noted by block 1508. In the default read mode, the transponder transmits the appropriate modulated RF field to the scanner, which contains both identification and temperature information. The scanner, after starting transmission of the transmit RF field, enters a read mode, where it waits to receive the modulated RF field from the transponder, as noted by block 1512. When the scanner receives the modulated RF field, it decodes the identification and temperature information. The scanner determines if the identification and temperature information were successfully decoded at block 1516. If the scanner was successful in decoding the information, it stores the identification and temperature data, as noted by block 1520. In one embodiment, the scanner has a memory which can store a predetermined amount of identification and temperature information, which can be transferred to a computer or other device for monitoring over a period of time. At block 1524, the scanner displays the identification and temperature information on a display, which a user can use to verify that a successful reading was obtained.

If the scanner determines at block 1516 that the identification and temperature information was not successfully decoded, the scanner determines whether it should continue searching, as noted by block 1528. The scanner makes this determination, in one embodiment, according to whether a user continues pressing a send button on the scanner. If the scanner determines that it is to continue searching, it returns to block 1512. If the scanner determines that it is not to continue searching, it displays an error message on the display, as noted by block 1532. In one embodiment, the scanner displays "No ID Found" on the display, indicating to the user that the scan was not successful in returning identification or temperature information. The scanner, after displaying either the identification and temperature information at block 1524, or displaying the error message at block 1532, then determines if another scan is requested, as noted by block 1536. In one embodiment, the scanner makes this determination according to whether a user is pressing a send button on the scanner. If the scanner determines that it is to scan again, it returns to block 1512. If the scanner determines that it is not to scan again, it powers off, as noted by block 1540.

In a further embodiment, the transponder may also collect other information from a host animal or other object in which the transponder is embedded, such as pressure, PH, blood sugar, blood oxygen, heart rate, or other diagnostic measurement. In this embodiment, if the transponder transmits using FDXA, it cycles through several transmissions to complete the transfer of all of the information collected. If the transponder transmits using FDXB, the additional information may be transmitted in the remaining trailer which is not used by the temperature information.

In one embodiment, the transponder is programmable to change transmission modes. In this embodiment, the transponder is programmed during testing and calibration, prior to being implanted into the host animal to transmit using either FDXA or FDXB transmission. Alternatively, as mentioned above, the transponder may be field programmable and can be programmed even after being implanted into the host animal. The programming is accomplished using electronically erasable programmable read only memory (EEPROM or flash memory). The transponder may be programmed either during the test portion of the fabrication process, or in the field using the scanner which has a mode which is capable to write to the memory.

In another embodiment, the memory in the transponder is capable of being programmed by the transponder, and can store information other than identification information to transmit to a scanner. For example, the transponder may be programmed with an owner's name and/or telephone number. In this embodiment, the transponder is able to be programmed with the additional information following the manufacturing process. A scanner may have a programming mode, which is used by the transponder to program the additional information. Following the programming, the transponder will transmit the additional information when it transmits the identification and temperature information. This may be done, in the case of an FDXA enabled transponder, by adding another transmission after the identification and temperature transmissions, which contains the information. In the case of an FDXB transponder, the additional bits in the trailer may be used to transmit this additional information, or the transponder may recycle and send another telegram containing additional information.

Furthermore, a transponder may be programmed with additional information, including history information, about the host, such as name, last medical examination date, last vaccination, and other similar information. In such a case, for example, a veterinarian may have a scanner which receives this information from the transponder when an animal initially begins treatment. The veterinarian may than have a record of the animal's name, body temperature, last examination, last vaccination, and other information prior to beginning the next examination. Once the examination is complete, the transponder can be programmed with updated information, using a scanner which is capable of transmitting programming information to the transponder.

While the transponder described above with reference to the drawing figures has been discussed primarily in reference to sensing a body characteristic of a host animal, it will be understood that other applications exist for the use of such a device. For example, such a transponder may be used in transferring materials which are required to be kept at a certain temperature, for example, organ transfers and transporting perishable food in a refrigeration truck. Similarly, other industrial applications exist, such as a transponder capable of sensing the temperature of a component of a machine or other apparatus. The above described invention may be used in such applications to identify a body characteristic associated with the body in which the transponder is embedded or mounted.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A temperature sensing transponder, comprising:
    an antenna portion operable to receive an interrogation signal from a reader and to transmit a data signal to the reader, said data signal including identification information and temperature information;
    an integrated circuit operatively associated with said antenna portion having a memory portion containing an identifier uniquely associated with the transponder and an integrated temperature sensor portion, said integrated temperature sensor portion including a temperature sensor and said temperature sensor including first and second bipolar junction transistor portions such that said temperature sensor is operable to generate an analog temperature signal which corresponds to a temperature of said temperature sensor, said integrated circuit operable to receive said interrogation signal from said antenna portion, and generate said data signal for transmission by said antenna portion,
    wherein said integrated circuit includes data related to said integrated temperature sensor portion, said data stored in said integrated circuit prior to said integrated circuit being operatively associated with said antenna portion, and
    wherein said first bipolar junction transistor portion contains a bipolar junction transistor and said second bipolar transistor portion contains a plurality of bipolar junction transistors.

2. A temperature sensing transponder, as claimed in claim 1, wherein said first and second bipolar junction transistor portions are operated at a substantially constant ratio of emitter current densities, and said analog temperature signal corresponds to a difference in base-emitter voltages between said first and second bipolar junction transistor portions.

3. A temperature sensing transponder, as claimed in claim 2, wherein:
said constant ratio of emitter current densities is greater than 1:1, and is preferably within the range of about 4:1 to 16:1, and is most preferably about 8:1.

4. A temperature sensing transponder, as claimed in claim 1, wherein said data signal includes at least one identification signal containing said identification information and at least one temperature signal containing said temperature information.

5. A temperature sensing transponder, as claimed in claim 4, wherein said data signal includes three of said identification signals and one temperature signal.

6. A temperature sensing transponder, as claimed in claim 4, wherein said identification signal includes a first header and an identification code, and said temperature signal includes a second header and a temperature code.

7. A temperature sensing transponder, as claimed in claim 1, wherein said data signal includes said identification information and said temperature information in a single signal structure.

8. A temperature sensing transponder, as claimed in claim 7, wherein said single signal structure includes a header, an identification code, a CRC, and a temperature code.

9. A temperature sensing transponder, as claimed in claim 1, wherein said integrated circuit is operable to store history information in said memory, and transmit said history information in response to an interrogation.

10. A temperature sensing transponder, as claimed in claim 9, wherein said history information includes additional identification information.

11. A temperature sensing transponder, as claimed in claim 1, wherein said data signal is FDXA compatible.

12. A temperature sensing transponder, as claimed in claim 1, wherein said data signal is FDXB compatible.

13. A temperature sensing transponder, as claimed in claim 1, wherein said integrated circuit is programmable to generate said data signal in an FDXA or FDXB compatible format.

14. A temperature sensing transponder, as claimed in claim 1, wherein said integrated temperature sensor portion outputs an analog temperature signal which corresponds to a temperature of said temperature sensor, and wherein said integrated circuit is operable to generate a digital temperature value based on said analog temperature signal and said data stored in said memory portion.

15. A temperature sensing transponder, as claimed in claim 14, wherein said data includes an analog trim value and a digital trim value.

16. A temperature sensing transponder, as claimed in claim 15, wherein said analog trim value is based on a difference between a measured analog temperature signal and an expected analog temperature signal.

17. A temperature sensing transponder, as claimed in claim 15, wherein said digital trim value is based on a difference between a measured digital temperature signal and an expected digital temperature signal.

18. A temperature sensing transponder, comprising:
an antenna portion operable to receive an interrogation signal from a reader and to transmit a data signal to the reader, said data signal including identification information and temperature information;
an integrated circuit operatively associated with said antenna portion having a memory portion containing an identifier uniquely associated with the transponder and an integrated temperature sensor portion, said integrated circuit operable to receive said interrogation signal from said antenna portion, and generate said data signal for transmission by said antenna portion,
wherein said integrated circuit includes data related to said integrated temperature sensor portion, said data stored in said integrated circuit prior to said integrated circuit being operatively associated with said antenna portion;
wherein said integrated circuit includes a selection circuit operable to select between a first and a second communication mode;
wherein, when said first communication mode is selected, said integrated circuit generates a first signal for inclusion in said data signal containing identification information and a second signal for inclusion in said data signal containing temperature information; and
wherein, when said second communication mode is selected, said integrated circuit generates a single signal for inclusion in said data signal containing identification and temperature information.

19. A temperature sensing transponder, as claimed in claim 18, wherein:
said integrated temperature sensor portion includes a temperature sensor and is operable to generate an analog temperature signal which corresponds to a temperature of said temperature sensor.

20. A temperature sensing transponder, as claimed in claim 19, wherein said temperature sensor includes P-N junction.

21. A temperature sensing transponder, as claimed in claim 19, wherein said temperature sensor includes first and second bipolar junction transistor portions.

22. A temperature sensing transponder, as claimed in claim 19, wherein: said temperature sensor is a silicon temperature sensor.

23. A temperature sensing transponder, as claimed in claim 19, wherein: said temperature sensor is a germanium temperature sensor.

24. A temperature sensing transponder, as claimed in claim 19, wherein: said temperature sensor is a gallium-arsenide temperature sensor.

25. A temperature sensing transponder, as claimed in claim 19, wherein:
said integrated circuit includes an analog to digital converter, said analog to digital converter being operable to receive said analog temperature signal and convert said analog temperature signal into a digital temperature code.

26. A temperature sensing transponder, as claimed in claim 25, wherein:
said data related to said integrated temperature sensor includes an analog trim value and said integrated circuit is operable to adjust said analog temperature signal based on said analog trim value.

27. A temperature sensing transponder, as claimed in claim 25, wherein:
said data related to said integrated temperature sensor includes a fine trim value, and said integrated circuit contains a serial adder operable to read said fine trim value from said memory and add said digital temperature code to said fine trim value to create said temperature information.

28. A temperature sensing transponder, as claimed in claim 18, wherein said first signal is in a FDXA format.

29. A temperature sensing transponder, as claimed in claim 18, wherein said single signal is in a FDXB format.

30. A temperature sensing transponder, as claimed in claim 18, wherein said integrated circuit is operable to store history information in said memory, and transmit said history information in response to an interrogation.

31. A temperature sensing transponder, as claimed in claim 30, wherein said history information includes additional identification information.

32. A temperature sensing transponder, as claimed in claim 18, wherein said integrated circuit is programmable to generate said data signal in an FDXA or FDXB compatible format.

33. A temperature sensing transponder, as claimed in claim 18, wherein said integrated temperature sensor portion outputs an analog temperature signal which corresponds to a temperature of said temperature sensor, and wherein said integrated circuit is operable to generate a digital temperature value based on said analog temperature signal and said data stored in said memory portion.

34. A temperature sensing transponder, as claimed in claim 33, wherein said data includes an analog trim value and a digital trim value.

35. A temperature sensing transponder, as claimed in claim 34, wherein said analog trim value is based on a difference between a measured analog temperature signal and an expected analog temperature signal.

36. A temperature sensing transponder, as claimed in claim 34, wherein said digital trim value is based on a difference between a measured digital temperature signal and an expected digital temperature signal.

37. A temperature sensing transponder, as claimed in claim 18, wherein said data related to said temperature sensor portion is calibration data.

38. A method for transmitting identification and temperature information from a transponder, comprising:
   retrieving identification information from a memory within said transponder;
   sensing an analog temperature signal from a temperature sensor within said transponder, said temperature sensor having first and second bipolar junction transistor portions operated at a substantially constant ratio of emitter current densities which is greater than 1:1, said analog temperature signal corresponding to a difference in base-emitter voltages between said first and second bipolar junction transistor portions;
   determining a calibrated digital temperature of said transponder, said calibrated temperature based on said analog temperature signal;
   formatting said identification information and said calibrated digital temperature into a data structure; and
   transmitting said data structure.

39. A method, as claimed in claim 38, wherein said determining a calibrated digital temperature step comprises:
   reading said analog temperature signal at an analog to digital converter;
   converting said analog temperature signal into a digital temperature value at said analog to digital converter;
   reading said digital temperature value at a processor; and
   adding a compensation value to said digital temperature value to obtain said calibrated digital temperature value.

40. A method, as claimed in claim 38, wherein said first data structure includes a telegram containing said identification information and said calibrated digital temperature information.

41. A method, as claimed in claim 40, wherein said telegram includes a header, an identification code, a CRC, and a trailer which contains said temperature information.

42. A method, as claimed in claim 39, wherein said compensation value is a linear offset.

43. A method, as claimed in claim 42, wherein said linear offset is a trim value.

44. A method, as claimed in claim 43, wherein said trim value is an analog trim value.

45. A method, as claimed in claim 43, wherein said trim value is a digital trim value.

46. A method, as claimed in claim 43, wherein said trim value includes an analog trim value and a digital trim value.

47. A method, as claimed in claim 38, wherein said transponder is a passive transponder.

48. A method, as claimed in claim 38, wherein said transponder is an implantable transponder.

49. A method, as claimed in claim 38, further comprising basing said analog temperature signal on a current corresponding to said difference in base-emitter voltages between said first and second bipolar junction transistor portions.

50. A method, as claimed in claim 38, further comprising basing said analog temperature signal on a voltage corresponding to said difference in base-emitter voltages between said first and second bipolar junction transistor portions.

51. A method, as claimed in claim 38, wherein said substantially constant ratio of emitter current densities is within the range of about 4:1 to 16:1.

52. A method, as claimed in claim 38, wherein said substantially constant ratio of emitter current densities is within the range of about 8:1.

53. A method for identifying an object and a temperature associated therewith, comprising the steps of:
   transmitting an interrogation signal from a reader;
   detecting said interrogation signal at a transponder;
   determining a selected communication mode at said transponder;
   transmitting an encoded identification and calibrated temperature signal from said transponder to said reader, wherein said encoded identification and calibrated temperature signal contains identification and calibrated temperature information in a first transmission-structure when a first communication mode is selected, and said encoded identification and calibrated temperature signal contains identification and calibrated temperature information in a second transmission structure when a second communication mode is selected;
   receiving said encoded identification and calibrated temperature signal at said reader; and
   decoding identification information and temperature information at said reader, wherein at least said identification information is contained in a standardized format within said encoded identification and calibrated temperature signal, and wherein said temperature information is the actual temperature of said object.

54. A method, as claimed in claim 53, wherein said standardized format complies with ISO standard 11785.

55. A method, as claimed in claim 53, wherein said transmitting an encoded identification and temperature signal step comprises:
   reading identification information from a memory;
   determining a calibrated temperature of said transponder using an integrated temperature sensor;
   formatting said identification information and temperature information into at least one telegram; and
   transmitting said at least one telegram as said encoded identification and temperature signal from said transponder to said reader.

56. A method, as claimed in claim 53, wherein, when said first communication mode is selected, said first transmission structure is a FDXB telegram and said temperature information is included in a trailer field within said FDXB telegram.

57. A method, as claimed in claim 53, further comprising:
generating an encoded identification and temperature calibration signal comprising converting said analog temperature signal into a digital temperature code.

58. A method, as claimed in claim 53, further comprising:
generating an encoded identification and temperature calibration signal comprising converting said analog temperature signal based on an analog trim value.

59. A method, as claimed in claim 53, further comprising:
reading a fine trim value from said memory and using said fine trim value to create said calibrated temperature information.

60. A method, as claimed in claim 53, wherein, when said second communication mode is selected, said second transmission structure comprises multiple FDXA telegrams and wherein at least a first FDXA telegram includes identification information and at least a second FDXA telegram includes temperature information.

61. A method, as claimed in claim 55, wherein further determining a calibrated temperature of said transponder using an integrated temperature sensor comprises generating an analog temperature signal which corresponds to a temperature of said temperature sensor.

62. A method, as claimed in claim 61, wherein said temperature sensor comprises first and second bipolar junction transistor portions operating at a substantially constant ratio of emitter current densities, and wherein generating said analog temperature signal comprises comparing the difference in base emitter voltages between said first and second bipolar junction transistor portions.

63. A method, as claim in claim 61, wherein determining said calibrated temperature information comprises sensing an analog temperature signal from said temperature sensor, adjusting said analog temperature signal temperature with an analog trim value and converting the adjusted analog temperature signal into a digital temperature code.

64. A system for identifying an object and a temperature associated therewith, comprising:
an interrogator operable to send an interrogation signal and operable to receive a responsive identification and temperature signal; and
a transponder, having an integrated temperature sensor and a selection circuit, operable to detect said interrogation signal and operable to transmit said identification and temperature signal in response to said interrogation signal,
wherein, when a first communication mode is selected at said selection circuit, said identification and temperature signal includes a first telegram containing identification information and a second telegram containing temperature information, wherein said temperature information includes an actual temperature of the object, and
wherein, when a second communication mode is selected at said selection circuit, said identification and temperature signal includes at least one telegram containing identification information and temperature information, wherein said temperature information includes an actual temperature of the object.

65. A system, as claimed in claim 64, wherein said interrogator and said transponder are inductively coupled, such that said transponder is powered by said interrogation signal transmitted by said interrogator.

66. A system, as claimed in claim 64, wherein said first telegram includes a first header field and an identification field which correspond to ISO standard 11785.

67. A system, as claimed in claim 66, wherein said second telegram includes a second header field and a temperature information field containing a digital value which is associated with a temperature of said integrated temperature sensor.

68. A system, as claimed in claim 67, wherein said first header field is different that said second header field.

69. A system, as claimed in claim 68, wherein said interrogator is operable to detect said first telegram based on said first header field and said second telegram based on said second header field.

70. A method, as claimed in claim 65, wherein, when said second communication mode is selected, said second transmission structure is a plurality of telegrams with said identification information in at least one FDXA telegram and said temperature information in at least one telegram having the same number of bits as said FDXA telegram.

71. A system, as claimed in claim 64, wherein said integrated temperature sensor is operable to generate an analog to temperature signal which corresponds to a temperature of said temperature sensor.

72. A system, as claimed in claim 71, wherein said temperature sensor includes a PN junction.

73. A system, as claimed in claim 71, wherein said temperature sensor includes first and second bipolar junction transistor portions.

74. A system, as claimed in claim 73, wherein said first and second bipolar junction transistor portions are operated at a substantially constant ratio of emitter current densities, and said analog temperature signal corresponds to a difference in base emitter voltages between said first and second bipolar junction transistor portions.

75. A system, as claimed in claim 74, wherein said constant ratio of emitter current densities is greater than 1:1.

76. A system, as claimed in claim 71, wherein said temperature sensor is a silicon temperature sensor.

77. A system, as claimed in claim 71, wherein said temperature sensor is a germanium temperature sensor.

78. A system, as claimed in claim 71, wherein said temperature sensor is a gallium-arsenide temperature sensor.

79. A system for identifying an object and a temperature associated therewith, comprising:
an interrogator operable to send an interrogation signal and operable to receive a responsive identification and temperature signal; and
a transponder, having an integrated temperature sensor having a first bipolar junction transistor portion and a second bipolar junction transistor portion operated at a substantially constant ratio of emitter current densities, operable to detect said interrogation signal and operable to transmit said identification and temperature signal in response to said interrogation signal,
wherein said identification and temperature signal includes a telegram containing identification information and temperature information, wherein said temperature information includes an actual temperature of the object, said temperature information based on a difference in base-emitter voltages between said first bipolar junction transistor portion and said second bipolar junction transistor portion, and wherein said constant ratio of emitter current densities is greater than 1:1.

80. A system, as claimed in claim 79, wherein said interrogator and said transponder are inductively coupled, such that said transponder is powered by said interrogation signal transmitted by said interrogator.

81. A system, as claimed in claim 79, wherein said identification and temperature telegram includes a header field, an identification field, a CRC field, and a trailer field which correspond to ISO standard 11785.

82. A system, as claimed in claim 79, wherein said identification and transponder telegram includes a trailer field containing a digital value which is associated with said temperature of said integrated temperature sensor.

83. A system, as claimed in claim 82, wherein said interrogator is operable to determine a temperature of said transponder based on said digital value contained in said trailer field.

84. A method, as claimed in claim 79, wherein said substantially constant ratio of emitter current densities is within the range of about 4:1 to 16:1.

85. A method, as claimed in claim 79, wherein said substantially constant ratio of emitter current densities is within the range of about 8:1.

86. A method for transmitting identification and body characteristic information from a passive transponder, comprising:
  retrieving identification information from a memory within the transponder;
  determining a calibrated body characteristic value from a sensor within said transponder, said calibrated body characteristic value based on a sensed value from said sensor and at least one calibration value determined prior to said sensor being incorporated into said passive transponder;
  formatting said identification information into a first data structure and formatting said calibrated body characteristic value into a second data structure;
  transmitting said first data structure; and
  transmitting said second data structure.

87. A method, as claimed in claim 86, wherein said determining a calibrated body characteristic value step comprises:
  reading an analog current from said sensor; and
  determining said calibrated body characteristic value based on said analog current.

88. A method, as claimed in claim 86, wherein said determining a calibrated body characteristic value step comprises:
  reading an analog voltage from said sensor; and
  determining said calibrated body characteristic value based on said analog voltage.

89. A method, as claimed in claim 86, wherein said determining a calibrated body characteristic value step comprises:
  reading an analog current from said sensor at an analog to digital converter;
  converting said analog current into a digital value at said analog to digital converter; reading said digital value at a processor; and
  adding a compensation value to said digital value to obtain said calibrated body characteristic value.

90. A method, as claimed in claim 86, wherein said determining a calibrated body characteristic value step comprises:
  reading an analog voltage from said sensor at an analog to digital converter;
  converting said analog voltage into a digital value at said analog to digital converter;
  reading said digital value at a processor; and
  adding a compensation value to said digital value to obtain said calibrated body characteristic value.

91. A method, as claimed in claim 86, wherein said first data structure includes an identification signal containing said identification information and said second data structure includes a body characteristic value signal containing said body characteristic value information.

92. A method, as claimed in claim 91, wherein identification signal includes a first header and an identification code, and said body characteristic value signal includes a second header and a body characteristic value code.

93. A method, as claimed in claim 86, wherein said transmitting said first data structure step includes transmitting said first data structure a predetermined number of times and said transmitting said second data structure step includes transmitting said second data structure a predetermined number of times.

94. A method, as claimed in claim 93, wherein said transmitting said first data structure step includes transmitting said first data structure three times in succession and said transmitting said second data structure step includes transmitting said second data structure once.

95. A transponder which is operable to sense a body characteristic of a host animal, comprising:
  an antenna portion operable to receive an interrogation signal from a reader and to transmit a data signal to the reader, said data signal including identification information and body characteristic information; and
  an integrated circuit having a memory portion containing an identifier uniquely associated with the transponder, a selection circuit operable to select between a first and a second communication mode, and a sensor portion, said integrated circuit operable to receive said interrogation signal from said antenna portion, and generate said data signal for transmission by said antenna portion,
  wherein when said first communication mode is selected, said integrated circuit generates said data signal in a first auto transmission format, containing identification information and temperature information, and
  wherein, when said second communication mode is selected, said integrated circuit generates said data signal in a second auto transmission format, containing identification and temperature information.

96. A transponder, as claimed in claim 95, wherein:
  said body characteristic information is the body temperature of the host animal.

97. A transponder, as claimed in claim 95, wherein said first auto transmission format comprises at least a first telegram including said identification information and a second telegram including said temperature information, and said second auto transmission format comprises at least a single telegram containing said identification and temperature information.

98. A transponder, as claimed in claim 95, wherein said first auto transmission format is an FDXB format.

99. A transponder, as claimed in claim 95, wherein said second transmission format is an FDXA format.

100. A system for identifying an object and a body characteristic associated therewith, comprising:
  an interrogator operable to send an interrogation signal and operable to receive a responsive identification and body characteristic signal; and
  a transponder, including in integrated circuit having an integrated sensor having a first bipolar junction transistor portion and a second bipolar junction transistor portion operated at a substantially constant ratio of emitter current densities, operable to detect said interrogation signal and operable to transmit said identification and body characteristic signal in response to said interrogation signal, wherein said identification and body characteristic signal includes a first telegram containing identification information and a second telegram containing body characteristic information, and wherein said body characteristic information is based on a difference in base-emitter voltages between said first bipolar junction transistor portion and said second bipolar junction transistor portion, and wherein said constant ratio of emitter current densities is greater than 1:1.

101. A system for identifying an object and a body characteristic associated therewith, as claimed in claim 100, wherein:
said body characteristic is the body temperature of a host animal.

102. A method, as claimed in claim 100, wherein said substantially constant ratio of emitter current densities is within the range of about 4:1 to 16:1.

103. A method, as claimed in claim 100, wherein said substantially constant ratio of emitter current densities is within the range of about 8:1.

104. A system for identifying an object and a body characteristic associated therewith, as claimed in claim 100, wherein said identification and body characteristic signal comprises multiple first telegrams and a single second telegram.

105. A system for identifying an object and a body characteristic associated therewith, as claimed in claim 100, wherein said identification and body signal comprises multiple second telegrams and one first telegram.

106. A system for identifying an object and a body characteristic associated therewith, as claimed in claim 100, wherein said first and second telegrams are transmitted in an FDXA format.

107. A system for identifying an object and a body characteristic associated therewith, as claimed in claim 100, wherein said first and second telegrams are transmitted in an FDXB format.

108. A system for identifying an object and a body characteristic associated therewith, as claimed in claim 100, further comprising memory associated with said integrated circuit and history information stored in said memory, wherein said transponder is operable to transmit said history information in response to an interrogation.

109. A system for identifying an object and a body characteristic associated therewith, as claimed in claim 101, further comprising a memory portion associated with said transponder, wherein said integrated sensor outputs an analog temperature signal corresponding to the temperature of the sensor and wherein the integrated circuit generates a digital temperature value based upon said analog temperature signal and data stored in said memory.

110. A system for identifying an object and a body characteristic associated therewith, as claimed in claim 109, wherein said data is a single parameter.

111. A system for identifying an object and a temperature associated therewith, comprising:
an interrogator operable to send an interrogation signal and operable to receive a responsive identification and temperature signal; and
a passive transponder, including an integrated circuit operatively associated with an antenna, said integrated circuit having an integrated temperature sensor, and said integrated circuit including calibration data related to said integrated temperature sensor, said calibration data stored in said integrated circuit prior to said integrated circuit being operatively associated with said antenna and used to create said temperature signal,
wherein said passive transponder is operable to detect said interrogation signal and operable to transmit said identification and temperature signal in response to said interrogation signal.

112. A system, as claimed in claim 111, wherein said identification and temperature signal includes a cyclical stream of data structures, wherein each data structure includes identification and actual temperature information.

113. A system, as claimed in claim 111, wherein said identification and temperature signal includes a cyclical stream of data structures including a first data structure and a second data structure, wherein identification information is included in said first data structure and temperature information is included in said second data structure.

114. A system, as claimed in claim 113, wherein said cyclical stream of data structure includes a cyclical transmission of said first and second data structures.

* * * * *